United States Patent [19]
Sato

[11] Patent Number: 5,752,108
[45] Date of Patent: May 12, 1998

[54] RECORDING DATA ERECTING APPARATUS

[75] Inventor: Tadashi Sato, Chiba, Japan

[73] Assignee: Seiko Instruments Inc., Japan

[21] Appl. No.: 548,296

[22] Filed: Nov. 1, 1995

[51] Int. Cl.⁶ ............................................. G03B 17/24
[52] U.S. Cl. ................... 396/310; 396/287; 396/299
[58] Field of Search ..................... 354/106, 289.12;
396/50, 281, 287, 299, 310, 315, 316, 317, 318, 319

[56]        References Cited

U.S. PATENT DOCUMENTS

| | | | |
|---|---|---|---|
| 4,183,645 | 1/1980 | Ohmura et al. | 354/106 |
| 4,330,186 | 5/1982 | Hattori | 354/106 |
| 4,740,803 | 4/1988 | Hardy | 354/80 |
| 4,801,793 | 1/1989 | Vaynshteyn | 354/289.12 |
| 5,128,702 | 7/1992 | Ogawa et al. | 354/106 |
| 5,144,358 | 9/1992 | Tsura et al. | 354/403 |
| 5,198,851 | 3/1993 | Ogawa | 354/412 |
| 5,289,217 | 2/1994 | Rosenblatt | 354/76 |
| 5,499,074 | 3/1996 | Ohsawa et al. | 354/402 |
| 5,526,078 | 6/1996 | Itoh et al. | 354/106 |
| 5,534,957 | 7/1996 | Miyamoto et al. | 354/106 |
| 5,649,247 | 7/1997 | Itoh et al. | 396/311 |

*Primary Examiner*—Safet Metjahic
*Assistant Examiner*—John Chizmar
*Attorney, Agent, or Firm*—Adams & Wilks

[57]        ABSTRACT

A recording data erecting apparatus for a camera comprises a data input section for inputting a recording data, and a data recording section for recording the recording data in a vertical direction of a photosensitive surface of a film or a horizontal direction thereof. An erection direction input unit is electrically connected to the data recording section for inputting an erection direction of the recording data. A display unit is electrically connected to the data input section for displaying the erection direction of the recording data.

14 Claims, 20 Drawing Sheets

RECORDING DATA ERECTING APPARATUS

BACKGROUND OF THE INVENTION

The present invention relates to a data recording apparatus for use in a camera and, more particularly, to a data recording apparatus having a function to variably select in conformity with a photographing attitude of the camera one of the vertical and horizontal directions of data to be copied and recorded on a relevant film.

Data recording cameras each having an electronic timepiece incorporated therein and arranged so that numerals such as a photographing day, month and year, or photographing minute and hour, and characters of a relevant brief message, which have been displayed by a liquid crystal or light emitting diode or the like, are recorded on the relevant film together with a photographed image have widely been put to practical use.

In cameras each equipped with the above-mentioned data recording apparatus, when photographing is performed with the camera being set horizontally (ordinary attitude) or vertically in conformity with the photographing attitude of the camera, it is preferable to arrange the camera such that, with the attitude of data to be copied and recorded onto the film being also set horizontally or vertically, the data are copied and recorded, namely, recording data are erected relative to the erection direction of a photographed image.

Most of conventional cameras having data recording apparatuses were each constructed so that only when photographing was performed with the camera set in its horizontal attitude (ordinary attitude), recording data become erect or upright. An example of the data recording apparatus according to a conventional technique is illustrated in FIG. 17. This data recording apparatus is composed of a lighting section 301, data display section 302, imaging lens 303 and film 304.

Also, there is a data recording apparatus which is composed of a sensor for detecting the vertical and horizontal attitudes of the camera, data display sections for copying and recording of data onto the film by using liquid crystal shutters or light emitting diodes disposed in the vertical and horizontal directions of the camera, and control means for selectively illuminating any desired one of the data display sections according to the detected signals of the sensors. FIG. 19 is a view illustrating the structure of this data recording apparatus. An attitude detecting sensor 401 is composed of weights 403 and 404 rockable about a shaft 402, vertical position read switches 405 and horizontal position read switches 406. The signals from the vertical position read switches 405 and horizontal position read switches 406 are input to a position selecting mechanism, thereby operating a recording mechanism. The above structure of the conventional data recording camera is disclosed in, for example, Published Unexamined Japanese Patent Application No. S-58-52627.

Also, there is a data recording apparatus which is constructed so that the horizontal or vertical direction of recording data can be selected by driving and adjusting an optical system leading data image of the data display section onto the film surface, i.e. a combination of an image rotating prism or mirror for example. FIG. 20 is a view illustrating the structure thereof. This data recording apparatus is composed of a lighting section 501, data display section 502, imaging lens 503, movable mirror 504, mirror 505, prism 506, lens 507 and film 508. The above structure of this conventional data recording camera is disclosed in, for example, Published Unexamined Japanese Patent Application No. S-52-149118.

However, the conventional data recording camera had the problems which are shown as follows.

(1) When data are copied and recorded with the use of the apparatus as illustrated in FIG. 17, although no inconvenience occurs when photographing is performed with the camera set in its ordinary attitude, the following problem arises when photographing is performed with the camera set in its vertical attitude by a photographer's intention. That is, as illustrated in FIG. 18, the attitude of a photographed image screen and the attitude of copied/recorded data do not coincide with each other with the result that the photograph becomes an unnatural picture.

(2) In order to construct the apparatus so that recording data may at all times become erect relative to a vertical or horizontal photographed image, it is necessary to provide means for detecting the vertical or horizontal photographing attitude of a camera. As such a detecting means there is used a gravitational detecting type sensor. In the case of the gravitational detecting type sensor, although no problem arises when a photograph is taken with the photographing lenses of the camera directed in the horizontal direction, the following problem arises when the photographing lenses are directed downward. That is, the sensor becomes unstable with the result that there may be a case wherein it is impossible to exactly select one of the vertical and horizontal data recording directions.

(3) Equipping the apparatus with the recording data display sections disposed respectively independently in the vertical and horizontal directions is followed by an increase in number of the parts employed and an increase in complexity of the mechanism. The amount of data capable of being copied and recorded also is limited.

(4) The data recording apparatus which is constructed so that the horizontal direction and vertical direction of recording data can be selected by driving and adjusting the optical system for leading a data image of the data display section onto the film surface has the shortcoming that the number of the parts used in the optical system is increased and the complexity of the mechanism in terms of the driving and adjustment is also increased.

In view of the above, the present invention has the following objects in order to solve the above-mentioned conventional problems.

(1) To enable the selection and erection of data such as characters, numerals or the like in any freely selected one of the vertical and horizontal directions in conformity with the attitude of a photographing image screen according to the instruction made from the side of an external input device by operation thereof and with necessitating the use of no complex parts construction, mechanism or optical system.

(2) By providing the main body of the camera or data input section with the display means enabling the confirmation of the erection direction of the recording data as instructed from the side of the input device by operation thereof, to decrease errors regarding the photographing data recording direction and thereby make a photographed data-copied/recorded picture easy to see and read.

SUMMARY OF THE INVENTION

In order to achieve the above objects, according to the present invention, a data recording apparatus for use in a camera is constructed such that it comprises a data recording section enabling the copying of data onto the surface of a film in both the vertical direction and the horizontal direction thereof, a data input section enabling the performance of the operation of writing data into the film surface in both the vertical direction and the horizontal direction, and display means enabling the confirmation of the erection direction of data to be copied and recorded upright which has been instructed by the operation of the data input section.

Further, there is provided means for detecting the direction in which a main body of the camera is directed to thereby automatically discriminate the erection direction in which data are to be copied and recorded upright and thereby enable writing of data in the erection direction at all times with respect to a photographed image deemed to be seen upright.

DETAILED DESCRIPTION OF THE PREFERRED EMBODIMENTS

Embodiments of the present invention will now be described hereafter with reference to the drawings.

Figure 1:
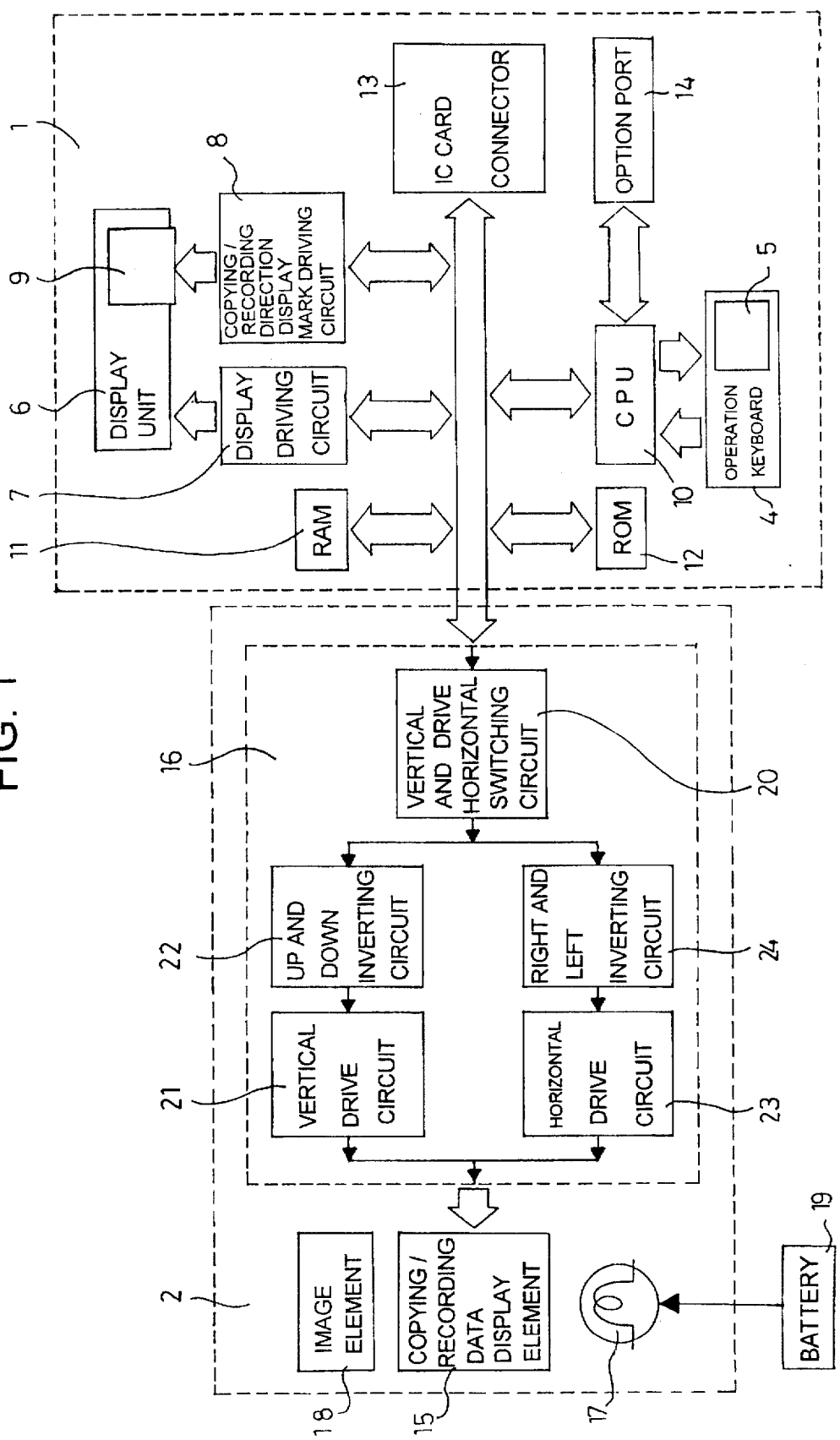
FIG. 1 is a functional block diagram illustrating an example of a representative construction of a recording data erecting apparatus according to the present invention.

FIG. 1 is a functional block diagram illustrating an example of a representative construction of the apparatus for erecting data to be copied and recorded according to the present invention.

The apparatus of the present invention is composed of a data input section 1 and a data recording section 2.

The data input section 1 is composed of an operation keyboard 4, recording direction instruction key 5, display unit 6, display driving circuit 7, recording direction display mark driving circuit 8, recording direction display mark 9, CPU 10, RAM 11, ROM 12, IC card connector 13, and option board 14.

On the operation keyboard 4 there are disposed various input keys including the recording direction instruction key 5 enabling the instruction by operation thereof of the erection direction of data to be copied and recorded upright.

Although rubber keys are used as the input keys disposed on the operation keyboard 4, membrane keys, hard top keys, or the like may be used. Particularly, since membrane keys have water resistance characteristics, they are effective for outdoor use of the camera. As data input means there can be used not only key switches but also a method of inputting data by a pen or voice.

The display unit 6 such as that made of liquid crystal inputs the output signal from the display driving circuit 7 and thereby displays data to be copied and recorded such as numerals, characters, or the like according to their corresponding key operations on the operation keyboard 4. As the display unit there are an LED panel, braun tube, plasma display, and the like. Although the display unit 6 and the display driving circuit 7 are constituent elements of the data input section 1 in FIG. 1, they may be disposed in one or each of the camera body and the data input section independent therefrom.

The IC card connector 13 is used when an IC card, FRAM card, or the like is used. This enables the communication such as data reading, data storing, or the like between the data input section 1 and an external memory. The option card 14 is used for data transmission between the data input section 1 and another data input section, an external personal computer, or the like.

The data recording section 2 is composed of a recording data display element 15, display driving circuit 16, lighting element 17, and optical element 18.

The data to be copied and recorded set in the data input section 1 by the operation thereof is transmitted to the data recording section 2. The recording data display element 15 displays recording data images according to the output signal from the display driving circuit 16.

When a shutter button of the camera is operated, a power source voltage is supplied from a battery 19 to the lighting element 17 disposed near the recording data display element 15, whereby the lighting element 17 is lit up for a prescribed time period. Image data such as characters, numerals, or the like which have been displayed by the recording data display element 15 are illuminated with the result that the recording data are copied and recorded, together with a photographed image, onto a photosensitive surface of the film by means of the optical element 18.

As the optical element for imaging recording data on the film surface there is used an optical lens as a single member, an imaging lens system prepared by combining two or more such optical lenses, a fiber lens, or the like.

As a control method for the illumination time period there is not only a control method for controlling the illumination time period by lighting-up of the lighting element for a prescribed time period but also a control method for controlling the illumination time period by transmission of light by and through the recording data display element for a prescribed time period.

The display driving circuit 16 is composed of a vertical and horizontal drive switching circuit 20, a vertical drive circuit 21, an up and down inverting circuit 22, a horizontal drive circuit 23, and a right and left inverting circuit 24. The vertical and horizontal drive switching circuit 20 switches an image signal which is output to the vertical drive circuit 21 or the horizontal drive circuit 23. This enables switching of a display screen from a horizontal display screen to a vertical display screen by rotation of the display screen through an angle of 90 degrees. The up and down inverting circuit 22 switches the scan direction of the vertical drive circuit 21. This enables the procurement of an up and down inverted image. The right and left inverting circuit 24 switches the scan direction of the horizontal drive circuit 23. This enables the procurement of a right and left inverted image.

When data is copied and recorded with the camera being set horizontally (ordinary attitude), the recording direction instruction key 5 of the operation keyboard 4 is operated so that the erection direction of the recording data coincides with the erection direction of a foreground subject image to be photographed. Upon instruction of the recording direction instruction key 5, in the display driving circuit 16, a signal is output therefrom to the recording data display element 15 through only the operations of the vertical drive circuit 21 and horizontal drive circuit 23. Meanwhile, when recording of data have been instructed with the upside down by and from the recording direction instruction key 5, the vertical drive circuit 21, up and down inverting circuit 22, horizontal drive circuit 23 and right and left inverting circuit 24 are operated with the result that the recording data display element 15 displays the data so that when the camera is set with the upside down, the recording data becomes erect relative to the foreground subject. In order to erect data relative to a vertical attitude of the camera with its left and right being set up and down respectively, the display image screen is rotated through an angle of 90 degrees from the horizontal display image screen to the vertical display image screen through the operation of the vertical and horizontal drive switching circuit 20. Also, through the operations of the vertical and horizontal drive switching circuit 20, vertical drive circuit 21, up and down inverting circuit 22, horizontal drive circuit 23, and right and left inverting circuit 24, inversion of from the left/up vertical direction to the right/up vertical direction is possible.

As mentioned above, the recording data display element 15 can also make its image display in the left/up and right/down vertical direction and in the exactly reversed direction from the ordinary direction. Namely, recording data can be copied and recorded in such a manner that they are erected horizontally when photographing is performed in a landscape format, with the camera being set horizontally in conformity with a photographing attitude of the camera; and they are erected vertically when photographing is performed in a portrait format, with the camera being set vertically in conformity therewith.

Also, when the erection direction of recording data is instructed from the recording direction instruction key 5 on the operation keyboard 4 by operation thereof, an output signal is supplied to the recording direction display mark driving circuit 8. This recording direction display mark driving circuit 8 outputs a signal for driving the data recording direction display mark 9 disposed at part of the display unit 6 for displaying the recording direction of data. By providing at a part of the display unit 6 the display means operating in synchronism with the operation and instruction of the operation keyboard 4, it is possible to confirm the inputting of the erection direction of recording data.

(1) First Embodiment

Figure 2:
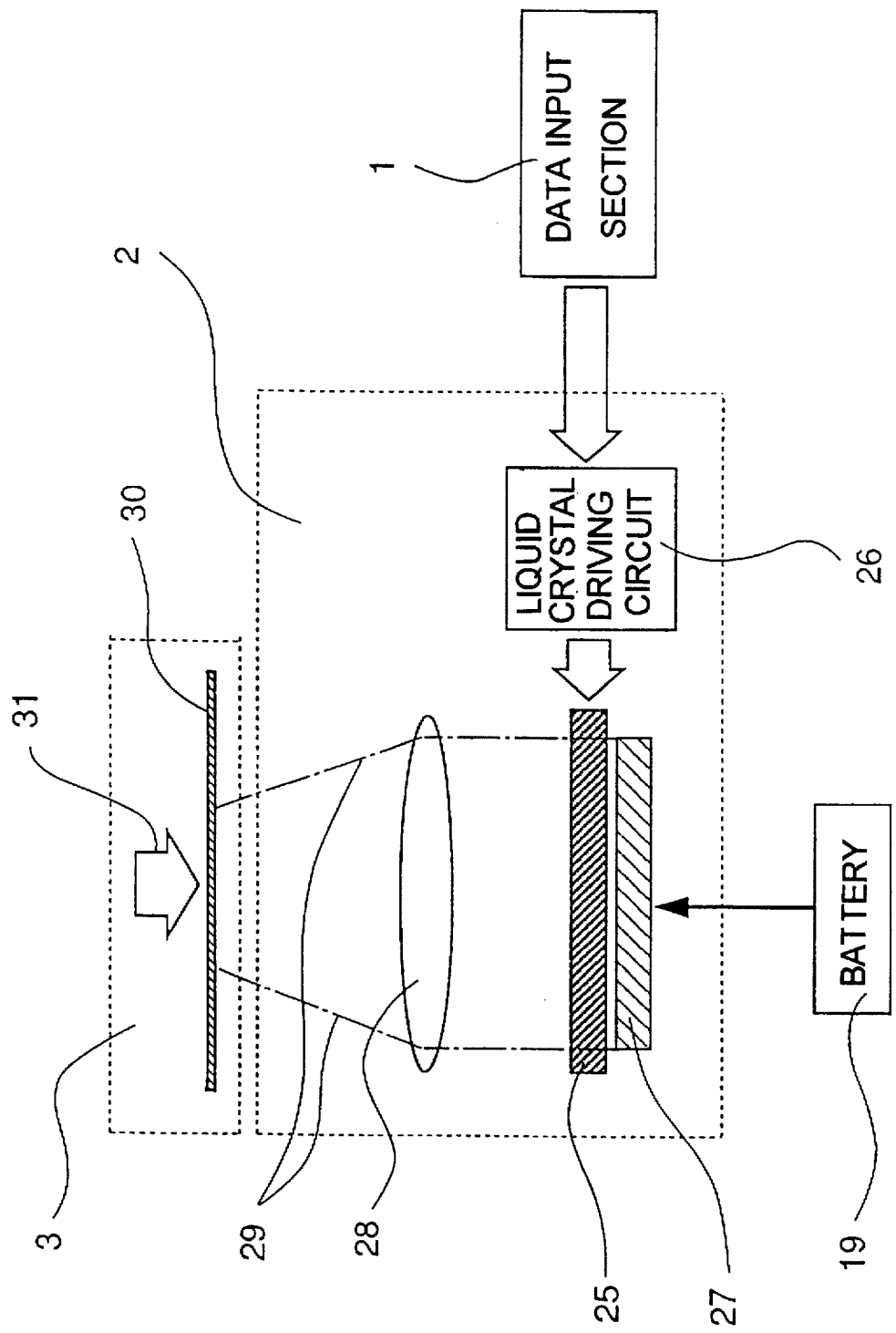
FIG. 2 is a block diagram illustrating a first structure of a data recording section of the recording data erecting apparatus according to a first embodiment of the present invention.

FIG. 2 is a block diagram illustrating a first structure of a data recording section of a recording data erecting apparatus according to a first embodiment of the present invention.

The first structure of the data recording section 2 according to this embodiment is composed of a liquid crystal shutter 25, a liquid crystal driving circuit 26, a lighting element 27, and an imaging lens 28. This data recording section 2 is mounted on a back cover side of a main body 3 of the camera. Copying and recording of data onto a photographed image screen of the film are performed from the back side thereof.

As the recording data display element 15 there is used the dot matrix liquid crystal shutter 25 having vertical 320 pixels×horizontal 320 pixels. Recording data are set from the data input section 1 by operation thereof. Individual pixel switches composing the liquid crystal shutter 25 are turned ON and OFF by the output signal from the liquid crystal driving circuit 26, whereby they become a specific image of characters or numerals. This image is the same as that of recording data which has been displayed on the display unit 6 of the data input section 1. For example, since the liquid crystal shutter 25 of this embodiment is set such that, in the case of a kanji character font, one kanji character can be displayed usually using horizontal 16 pixels×vertical 16 pixels, it is possible to display 20 kanji characters at maximum in each of the vertical and horizontal directions.

The imaging lens 28 is used as the optical element 18. The lighting element 27 is disposed near the liquid crystal shutter 25. The lighting element 27 of this embodiment is a surface light source which uniformly illuminates all of the pixel switches on the liquid crystal shutter. Upon operation of a shutter button of the camera, a power source voltage is supplied from a battery 19 to the lighting element 27, with the result that the lighting element 27 is lit up for a prescribed time period. As a result, the image data such as characters or numerals displayed in the liquid crystal 25 are illuminated and imaged on the photosensitive surface of a film 30 via the imaging lens 28 and then are copied and recorded thereon.

Figure 3:
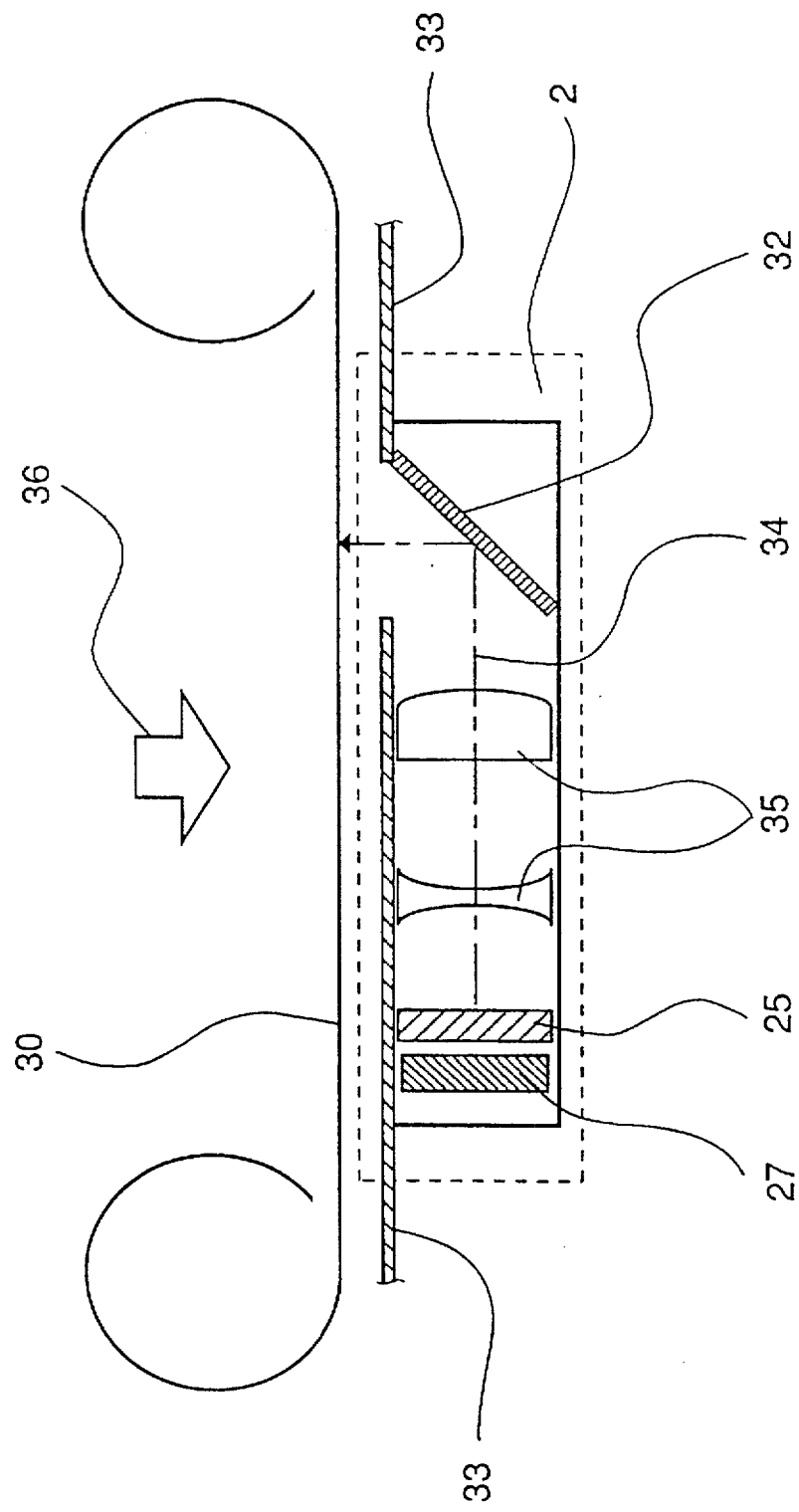
FIG. 3 is a sectional view illustrating a second structure of the data recording section of the recording data erecting apparatus according to the first embodiment of the present invention.

FIG. 3 is a sectional view illustrating a second structure of the data recording section of the recording data erecting apparatus according to the first embodiment of the present invention.

The second structure of the data recording section 2 according to this embodiment is the same as the first structure thereof in the disposition of the lighting element 27, liquid crystal shutter 25, imaging lens system 35 and film 30. However, in the second structure, a mirror 32 is disposed between the liquid crystal shutter 25 and the film 30. Also, as the optical element there is used the imaging lens system 35 prepared by combining optical lenses.

The lighting element 27 is lit up for a prescribed time period interlockingly with the shutter operation of the camera. The recording data displayed in the liquid crystal shutter 25 are illuminated and pass through the imaging lens 27. Then, the optical path 34 is bent by the mirror 32. The recording data are copied and recorded from a back side of the film 30 onto the photographing image screen. As a result of this, when comparing this second structure with the first structure of the data recording section 2 illustrated in FIG. 2, there is the effect that the projected portion on the back cover side of the camera can be reduced in size.

Figure 4:
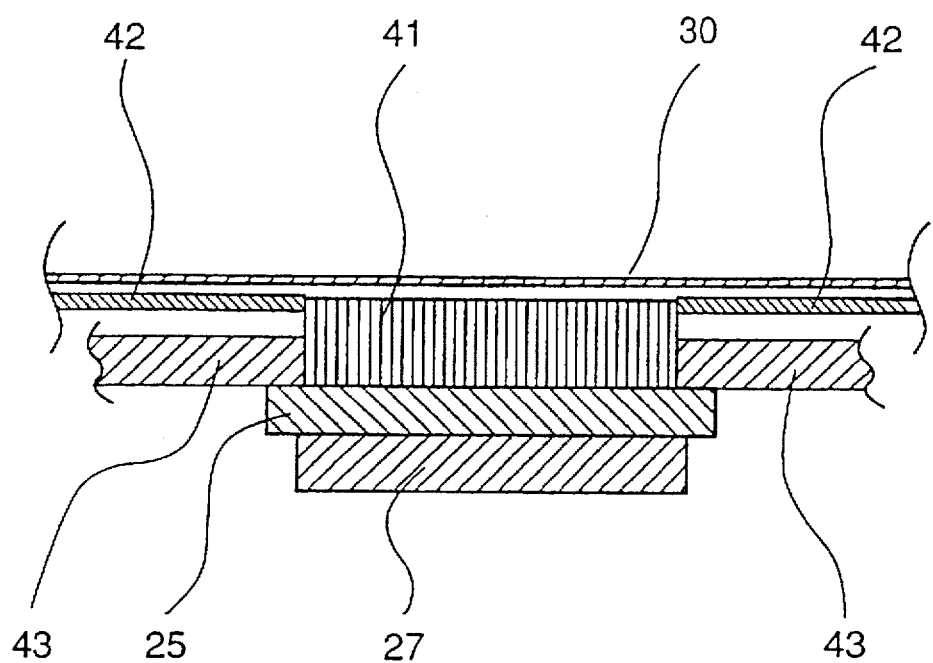
FIG. 4 is a sectional view illustrating a third structure of the data recording section of the recording data erecting apparatus according to the first embodiment of the present invention.

FIG. 4 is a sectional view illustrating a third structure of the data recording section of the recording data erecting apparatus according to the first embodiment of the present invention.

The third structure of the data recording section 2 according to this embodiment is composed of the lighting element 27, liquid crystal shutter 25, and fiber lens 41. This data recording section 2 is arranged such that the data are copied and recorded therein from the back cover side of the main body 3 of the camera.

The fiber lens 41 is an aggregate wherein fibers such as ceramic, plastic, or the like, capable of transmitting light therethrough, are bundled. In each of the individual fibers of which the fiber lens 41 is composed, the diameter of the fiber on the side thereof contacting with the liquid crystal shutter 25 is made to be smaller than the size of each of the pixels of which the liquid crystal shutter 25 is composed. As a result of this, the data image displayed in the liquid crystal shutter 25 are clearly copied and recorded onto the film 30.

Since the fiber lens permits bending of an optical path, the film 30 and the liquid crystal shutter 25 do not always need to be parallel with each other. Also, combining the imaging lens and the fiber lens is possible.

The lighting element 27 is lit up for a prescribed time period by the shutter operation of the camera. The recording data displayed in the liquid crystal shutter 25 are illuminated and then are copied and recorded from the back side of the film 30 onto the photographing image screen thereof via the fiber lens 41. As a result of this, when comparing the third structure and the first structure of the data recording section 2, there is the effect that the projected portion on the back cover side of the camera can be reduced in size.

Figure 5:
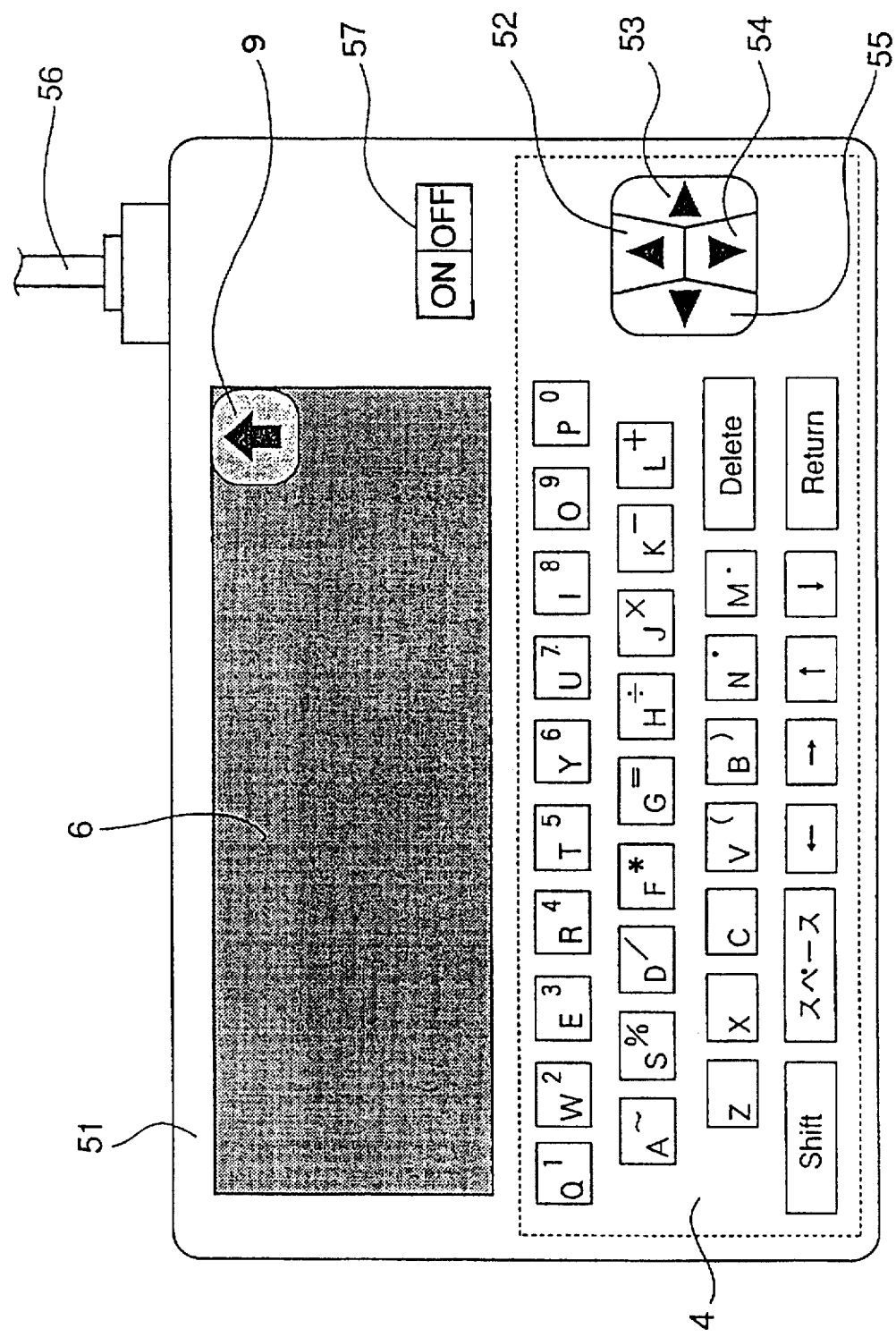
FIG. 5 is a plan view illustrating a third structure of an operation panel of a data input section of the recording data erecting apparatus according to the first embodiment of the present invention.

FIG. 5 is a plan view illustrating a first structure of an operation panel of the data input section of the recording data erecting apparatus according to the first embodiment of the present invention.

As illustrated in FIG. 5, the data input section 1 according to this embodiment is made up by an operation panel 51 independent of the camera. A connection line 56 is used for data transmission between the main body 3 of the camera and the operation panel 51, whereby on-line communication is possible between the two. In the present invention, other means such as infrared or wireless means may be used as the data transmission means. As a result of the use of such means, there is the effect that each of the main body of the camera and the operation panel can be independently used without using a connection line.

In the first structure of the operation panel according to this embodiment, the operation panel 51 is composed of the operation keyboard 4 and the display unit 6. Various input keys including recording direction instruction keys 52 to 55 enabling the instruction of the erection direction of data are arrayed on the operation keyboard 4. As the array of the inputting operation keys there may be used not only the QWERTY array illustrated in FIG. 5 but also an array of the kana syllabary order, an array of the alphabetical order, or the like. In the display unit 6, there is provided a display image screen including the recording direction instruction mark 9 which enables the confirmation of the recording direction of data.

While a pixel configuration of vertical 108 pixels× horizontal 320 pixels is used for the display unit 6 according to this embodiment, using a display unit having the same pixel configuration, i.e. vertical 320 pixels×horizontal 320 pixels, as that of the liquid crystal shutter 25 makes it possible to display the full image screen of recording data. It is also possible to use a display section having a smaller number of pixels than that of the display unit 6 used in this embodiment and scroll the display image screen in the vertical or horizontal direction and thereby monitor the recording data.

Upon operation of the recording direction instruction keys 52 to 55 of the operation keyboard 4, the erection direction of the recording data displayed in the liquid crystal shutter 25 changes. In initial setting, the attitude of the recording data is made to be that which conforms to the horizontally laid attitude (ordinary attitude) of a photographing image screen. This means that a state wherein the recording direction instruction key 52 has been depressed is initially set. Through the instruction of the recording direction instruction keys 52 to 55 by operation thereof, the recording data can be also displayed in the left/up and right/down vertical direction and in the reversed direction from the direction of the ordinary attitude by controlling the liquid crystal driving circuit 22. In other words, it is possible to freely select the attitude of the recording data so that the recording data becomes erect or upright in conformity with the attitude of an image to be photographed by the camera.

Also, the erection direction of recording data having been instructed from the recording direction instruction keys 52 to 55 of the operation keyboard 4 by operation thereof can be confirmed by providing in part of the display unit 6 the recording direction display mark 8 enabling the display of the data recording direction in synchronism with the operation and instruction of the recording direction instruction keys 52 to 55. For example, although in the photographing image screen with the camera in its ordinary attitude the recording direction display mark 9 is pointed upwardly of the drawing as illustrated in FIG. 5, when photographing is performed with the camera vertically inverted and an operator wishes to erect data in conformity with the photographing image screen, the recording direction instruction key 54 is depressed. As a result of this depression, the display of the recording direction display mark 9 changes to a downwardly pointed arrow-mark display. And simultaneously, the display made in the liquid crystal shutter 25 is switched so that recording data becomes erect relative to a vertically inverted photographing image. Note that as the recording direction instruction mark there may be used not only the arrow mark used in this embodiment but also characters, numerals, or other symbols.

Figure 6:
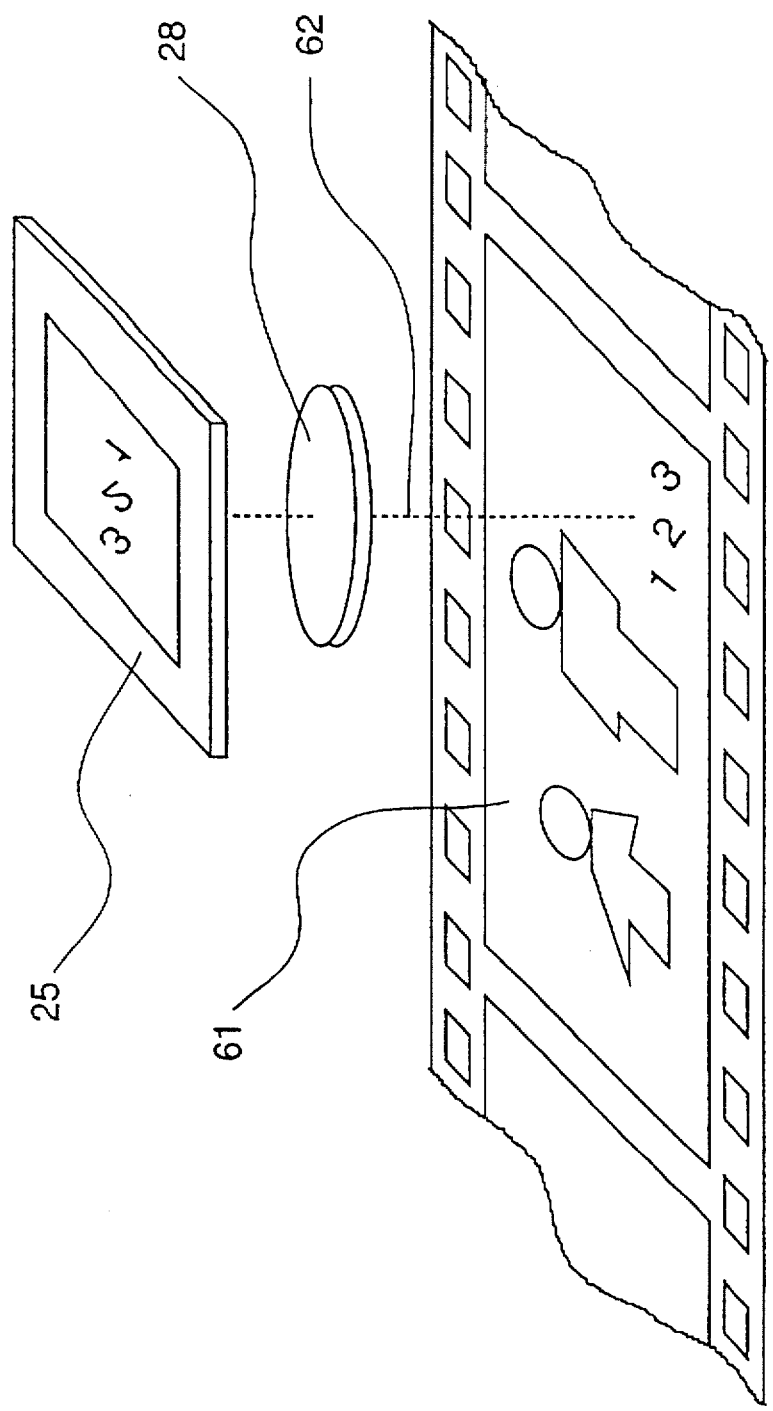
FIG. 6 illustrates one operation of a liquid crystal shutter of the recording data erecting apparatus according to the first embodiment of the present invention.

FIG. 6 illustrates the operation of the liquid crystal shutter according to the first embodiment of the present invention.

When the photographing attitude of the camera is horizontal, in order to operate the camera so that recording data are copied and recorded erectly relative to a photographing image screen 61, the liquid crystal shutter 25 displays recording data longitudinally of the photographing image screen 61 of the film 30 by instruction from the recording direction instruction key 52 or 54 made by operation thereof.

Figure 7:
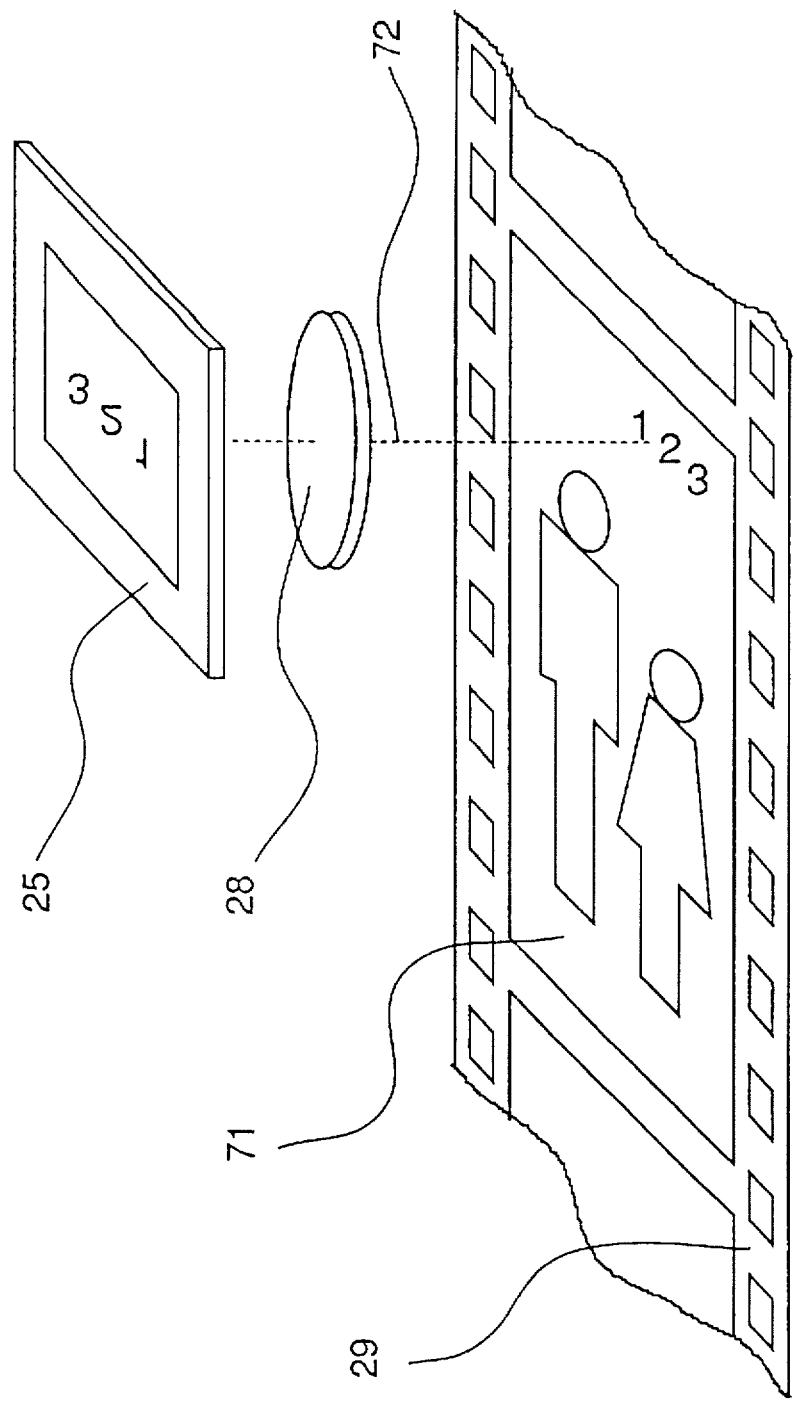
FIG. 7 illustrates another operation of the liquid crystal shutter of the recording data erecting apparatus according to the first embodiment of the present invention.

FIG. 7 illustrates another operation of the liquid crystal shutter according to the first embodiment of the present invention.

When the photographing attitude of the camera is vertical, in order to operate the camera so that recording data are copied and recorded erectly relative to a photographing image screen 71, the liquid crystal shutter 25 displays recording data in a direction perpendicular to the longitudinal direction of the photographing image screen 71 of the film 30 by instruction from the recording direction instruction key 53 or 55 made by operation thereof.

Figure 8:
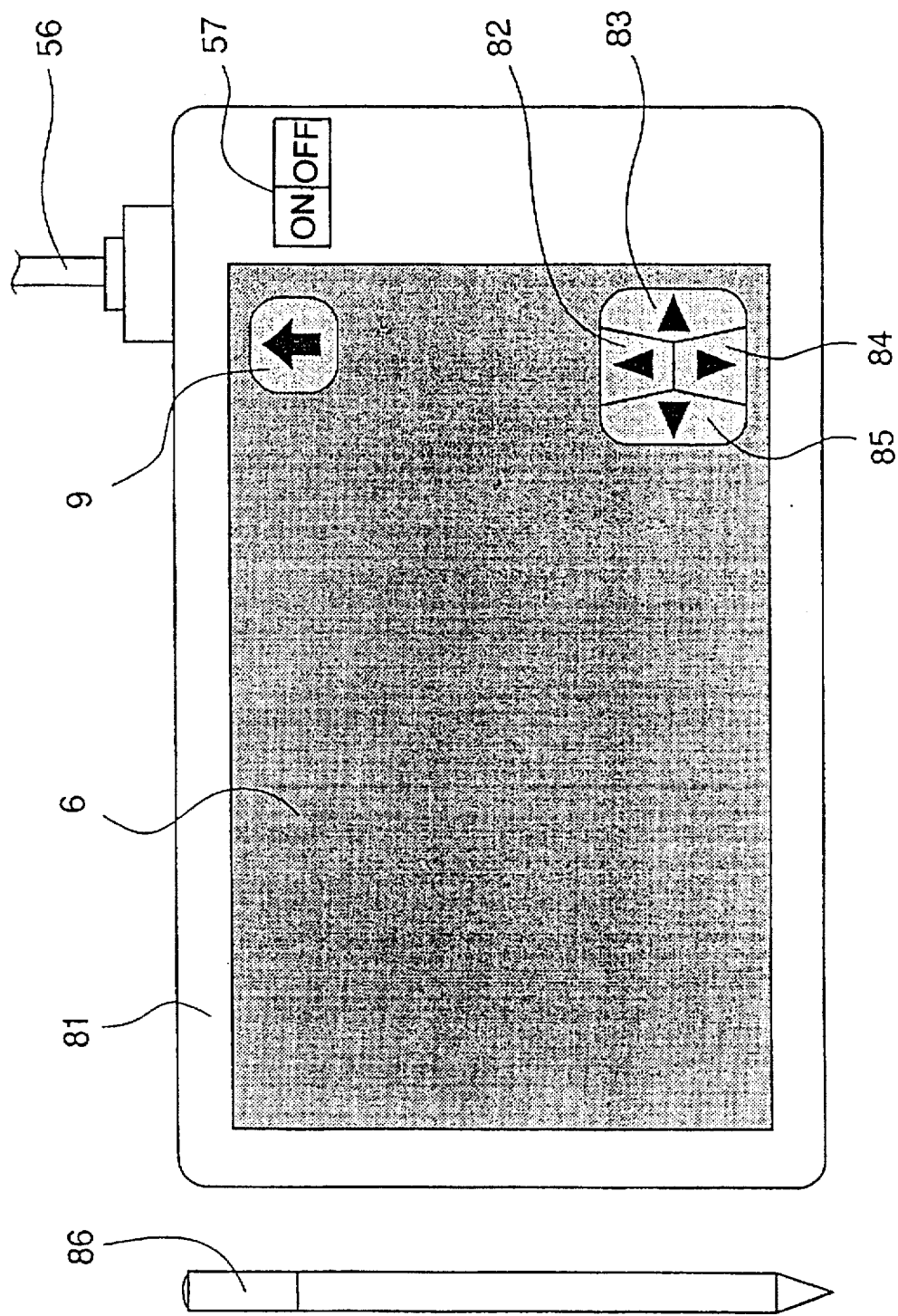
FIG. 8 is a plan view illustrating a second structure of the operation panel of the data input section of the recording data erecting apparatus according to the first embodiment of the present invention.

FIG. 8 is a plan view illustrating a second structure of the operation panel of the data input section according to the first embodiment of the present invention.

The second structure of the operation panel of the data input section 1 according to this embodiment is composed of an operation panel 81, inputting pen 82 and connection line 56 for data transmission.

The surface of the operation panel 81 is for the most part occupied by the display unit 6. The display unit 6 is composed of a display panel and a coordinate reader device (not illustrated in the drawing). As the coordinate reader device there are a pressure sensing type, electromagnetic induction type, electrostatic capacitance type, ultrasonic wave type, etc. The display unit 6 can be composed of any desired one of these types of coordinate reader devices.

At parts of the display unit 6 there are provided the recording direction instruction displays 82 to 85 and the recording direction display mark 9. The recording direction instruction displays 82 to 85 function to display the recording direction instruction keys on the display unit 6 and to enable the instruction of the erection direction of recording data by touching a display portion of the displays 82 to 85 by means of an inputting pen 86 which is a pointing device. Inputting of recording data can be performed by any one of a method of inputting them on the display unit 6 by hand-writing operation of the inputting pen 86 and a method similar to the key inputting method, of performing the touch operation using the inputting pen 86 with the operation keyboard being displayed on the display unit 6.

The operation method therefor can be performed in the same manner as in the case of the keyboard operation. Upon touch of one of the recording direction instruction displays 82 to 85 of the operation panel 81 by the inputting pen 86, the erection direction of the recording data displayed in the liquid crystal shutter 25 of the data recording section 2 changes. In initial setting, the attitude of the recording data is made to conform to the horizontally laid attitude (ordinary attitude) of a photographing image screen. Namely, a state wherein the recording direction instruction display 82 has been depressed is set. By controlling the liquid crystal driving circuit 26, the erection direction of the recording data can be freely selected according to the instruction made by the pen inputting operation of the recording direction instruction displays 82 to 85 so that these data become erect in conformity with a photographing image screen of the camera in any desired one of the left/up and right/down or left/down and right/up vertical direction and the reversed direction from that corresponding to the ordinary attitude.

The erection direction of the recording data having been instructed from the recording direction instruction displays 82 to 85 of the operation panel 81 by operation thereof can be confirmed by the recording display mark 9. The recording direction display mark 9 displays the data recording direction in synchronism with the instruction made by the pen inputting operation of the recording direction instruction displays 82 to 85. For example, although in the photographing image screen with the camera in its ordinary attitude the recording display mark 9 is pointed upwardly of the drawing as illustrated in FIG. 8, when photographing is performed with the camera being vertically inverted and an operator wishes to erect the data in conformity with the photographing image screen, the data recording direction display mark 84 is instructed by the inputting pen. As a result of this operation, the display of the data recording direction display mark 9 becomes a downwardly pointed arrow mark display, with the result that the display of the liquid crystal shutter 25 is simultaneously switched so that the recording data become erect relative to a vertically inverted photographing image screen.

(2) Second Embodiment

Figure 9:
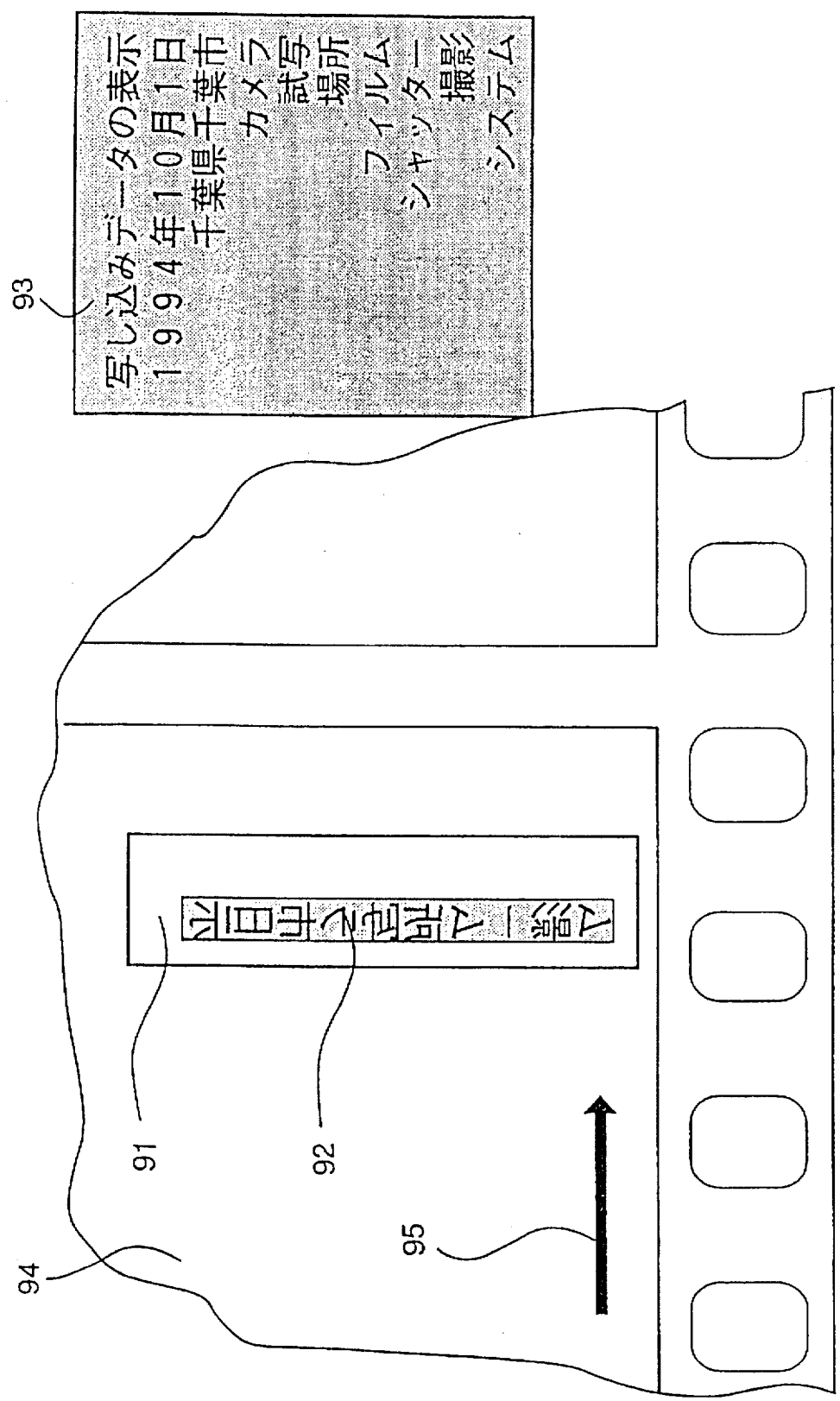
FIG. 9 is a plan view illustrating one operation of a recording data display element of a data input section of a recording data erecting apparatus according to a second embodiment of the present invention.
Figure 10:
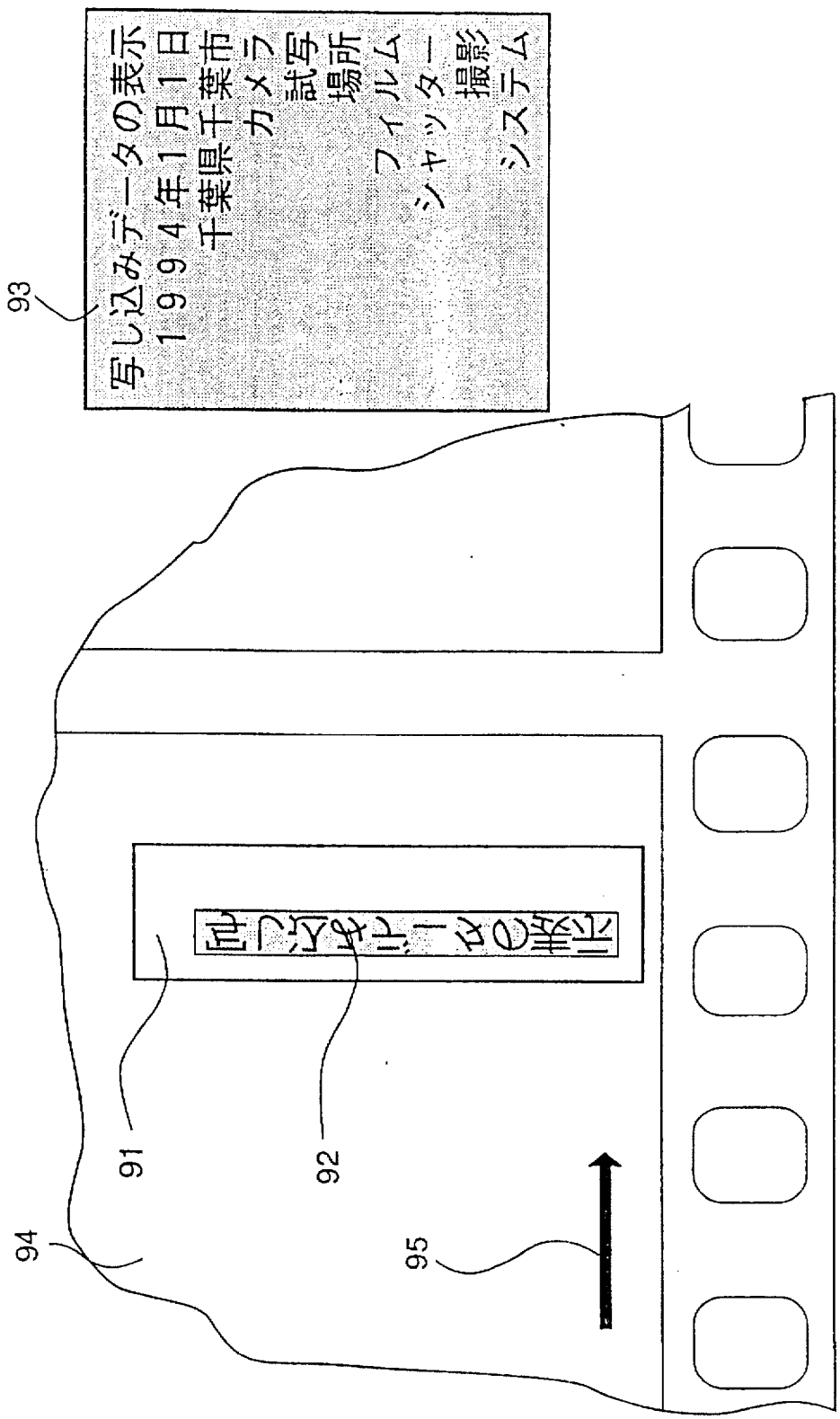
FIG. 10 is a plan view illustrating another operation of the recording data display element of the data input section of the recording data erecting apparatus according to the second embodiment of the present invention.

FIGS. 9 and 10 are plan views each illustrating the recording data display element of the data recording section of a recording data erecting apparatus according to a second embodiment of the present invention.

In this embodiment, the data recording section 2 is composed of a liquid crystal shutter 91, liquid crystal driving circuit 26, lighting element 27 and imaging lens 28. It is mounted on the back cover side of the main body 3 of the camera.

Recording data is set in the data input section 1 by operation thereof and then is transmitted to the data recording section 2. The liquid crystal shutter 91 displays the recording data by the output signal from the liquid crystal driving circuit 26.

The recording display element 15 uses a dot matrix liquid crystal shutter having a pixel configuration of vertical 160 pixels×horizontal 18 pixels. The liquid crystal shutter 91 according to this embodiment is set such that in the case of the kanji character font one kanji character can be displayed usually using a pixel configuration of vertical 16 pixels× horizontal 16 pixels. Therefore, 10 kanji characters in the vertical direction and 1 kanji character in the horizontal direction can be displayed with each kanji character commonly directed in any desired one of the vertical directions and horizontal directions.

The liquid crystal shutter 91 can make its image display in any desired one of the left/up and right/down or left/down and right/up direction and the reversed direction from that corresponding to the ordinary attitude of the camera according to the instruction made from the operation keyboard 4 of the data input section 1 by operation thereof by the control made from the liquid crystal driving circuit 26. Namely, it is possible to copy and record the recording data so that when photographing is performed with the camera set horizontally in conformity with the photographing attitude thereof, the data become vertically erect, and when photographing is performed with the camera set vertically in conformity with the photographing attitude thereof, the data become horizontally erect.

The liquid crystal shutter 91 is disposed in such a positional relationship as illustrated in FIGS. 9 and 10 with respect to the film 30.

In FIG. 9, the liquid crystal shutter 91 displays the right-side first column character arrangement of the recording data 93 having been instructed by the inputting operation. This display presents a display attitude of the recording data which is made to conform to the horizontally laid attitude (ordinary attitude) of a photographing image screen. The recording data are displayed vertically in one column. The imaging lens 28 is used as the optical element 18. The imaging lens 28 comprises a lens array (not illustrated in the drawing) which conforms to the liquid crystal shutter 91 and which is long in the vertical direction. The lighting element 27 is disposed close to the liquid crystal shutter 91. The lighting element 27 according to this embodiment is a surface light source which evenly illuminates all of the pixels on the liquid crystal shutter 91. Upon operation of the shutter button of the camera and subsequent commencement of the take-up operation of the film 30, a power source voltage is supplied from the battery 19 to the lighting element 27, whereby the lighting element 27 is lit up.

The liquid crystal shutter 91 displays image data such as characters, numerals, and the like in the first column for a prescribed time period and then closes the shutter to shield light. The first column data of the recording data 93 displayed in the liquid crystal shutter 91 are illuminated and are imaged on the photosensitive surface of the film 30 via the imaging lens 28, whereby the data are copied and recorded thereonto. In synchronism with the take-up operation of the camera, the liquid crystal shutter 91 next displays the second column data of the recording data 93 for a prescribed time period and then closes the shutter. The second column data displayed in the liquid crystal shutter 91 are illuminated and then are copied and recorded onto the film 30 via the imaging lens 28. Through the same operation as mentioned above, the third, the fourth, and the fifth—character column data of the recording data 93 are sequentially copied and recorded.

FIG. 10 illustrates a display attitude of the recording data in the liquid crystal shutter 91 which is made to conform to a vertically laid photographing image screen of the camera. The take-up direction 95 of the film is the upside of the photographing image screen 94. The first character row data of the recording data 93 are displayed in one lateral row. The operation of copying and recording the data onto the film 30 is performed in the same manner as stated in connection with FIG. 9 and the second, the third,—character row data of the recording data 93 are sequentially copied and recorded.

(3) Third Embodiment

Figure 11:
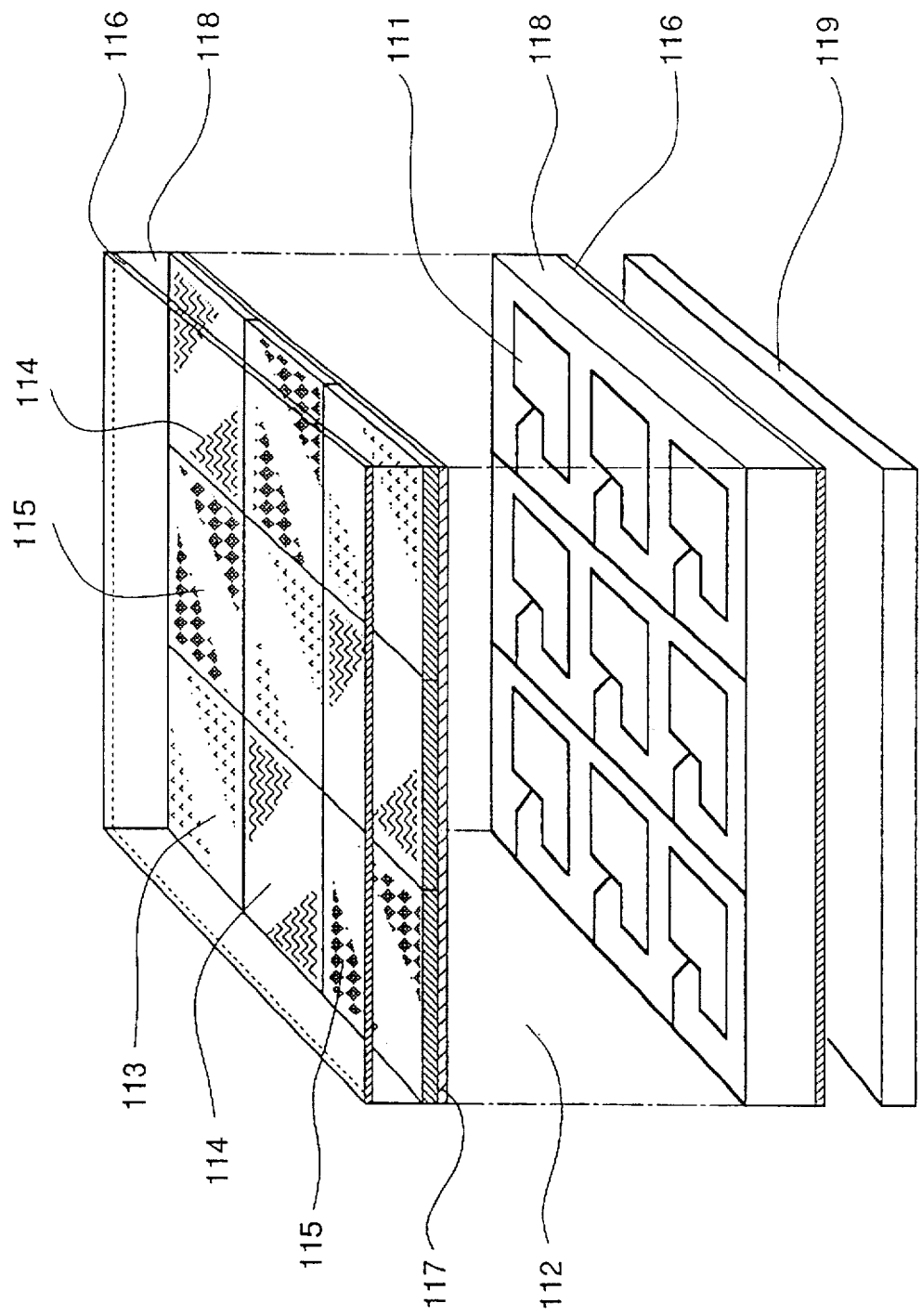
FIG. 11 illustrates a structure of a color liquid crystal shutter of a data recording section of a recording data erecting apparatus according to a fifth embodiment of the present invention.

FIG. 11 illustrates a structure of the recording data display element of the data recording section of a recording data erecting apparatus according to a third embodiment of the present invention.

The recording data display element used in the third embodiment is an active matrix liquid crystal shutter. The active matrix liquid crystal shutter can make color display. The active matrix type is of a structure wherein each pixel contains therein a thin film active element such as a transistor, diode or the like. As such an active element there are a single crystal silicon transistor, amorphous silicon transistor, polysilicon transistor, MIN diode, etc.

In this embodiment, the active matrix liquid crystal shutter is composed of thin film transistors 111, liquid crystal 112, R color filters 113, G color filters 114, B color filters 115, polarizing plate 116, common electrode 117, glass substrate 118 and lighting element 119. The liquid crystal 112 is a TN liquid crystal. The lighting element 119 uses a white-color-light surface light source illuminator. One combination of pixels respectively of the three primary colors composes a single pixel enabling color display.

As the active matrix liquid crystal shutter there is used the one the number of pixels of which is vertical 320 pixels× horizontal 320 pixels×3. Recording data are set from the data input section by operation thereof. The individual pixels, or thin film transistor switches, which compose the active matrix liquid crystal shutter, are turned on and off by the output signals from the liquid crystal driving circuit 26 to thereby display specific images of color characters, numerals or the like. Upon operation of the shutter button of the camera, a power source voltage is supplied from the battery 19 to the lighting element 119 which, in turn, is lit up for a prescribed time period. Thus, the color recording data such as characters, numerals or the like which have been displayed in the active matrix liquid crystal shutter are illuminated and then are imaged onto the photosensitive surface of the film 30 via the optical element 18 and thus copied and recorded thereon.

The active matrix liquid crystal shutter has a high contrast ratio of 100:1 and therefore is optimum as the shutter. Also, riot only multi-color display but also full color display is possible. As a result, a wide variety of decorations such as free coloring of recording data such as characters, numerals or the like can be imparted to the recording data.

As shown in this embodiment, color recording data can be copied and recorded onto the film surface by using the active matrix liquid crystal shutter as the recording data display element 15 of the data recording section 2.

(4) Fourth Embodiment

Figure 12:
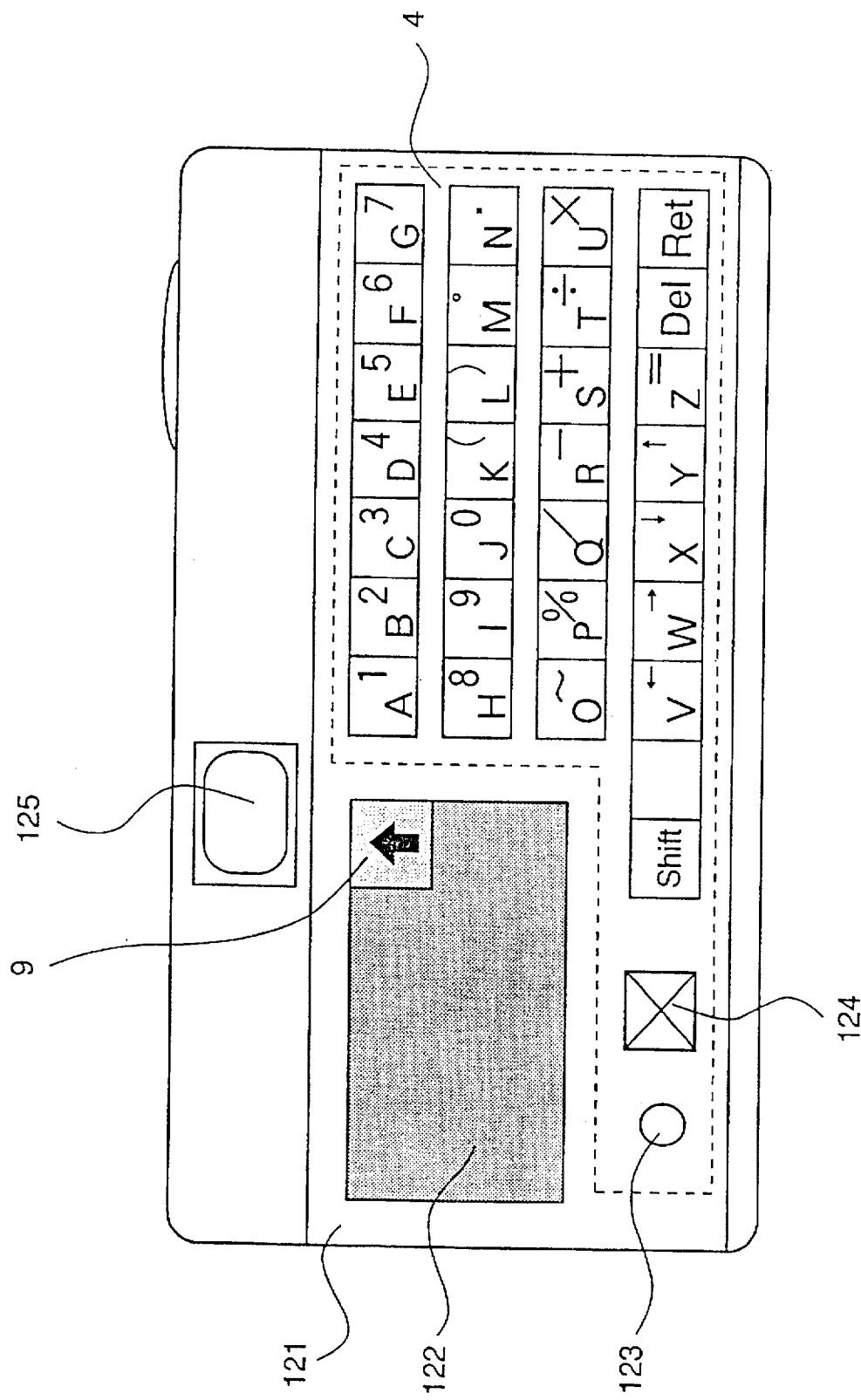
FIG. 12 illustrates a first structure of a data input section of a recording data erecting apparatus according to a third embodiment of the present invention.

FIG. 12 illustrates a first structure of the data input section of a recording data erecting apparatus according to a fourth embodiment of the present invention.

As illustrated in FIG. 12, in this embodiment, the operation keyboard 4 of the data input section 1 and the display unit 6 are mounted on the back cover side of the main body of the camera in an integrated form.

A recording direction instruction key 124 comprises part of the operation keyboard 4. By sequentially depressing the recording direction instructing key 124, the erection direction of the recording data displayed on the recording data display element 15 of the data recording section 2 changes in the order of ordinary attitude→right/up vertical attitude→vertically inverted attitude→left/up vertical attitude→ordinary attitude. The attitude of the recording data can be freely selected so that these data become erect in conformity with a photographed image of the camera.

As the display unit 6 according to this embodiment, there is used the one having a pixel configuration of vertical 54 pixels×horizontal 112 pixels. This pixel configuration corresponds to that of vertical 3 characters×horizontal 7 characters as converted in terms of the kanji characters. In the case where the amount of recording data information is larger than that corresponding to the display image screen of the display unit 6, the recording data information is monitored by scrolling the display image screen vertically and horizontally.

The recording direction display mark 9 is provided at part of the display unit 6. The recording direction display mark 9 displays the erection direction of recording data in synchronism with the recording direction instruction key 124. The erection direction of the recording data instructed from the recording direction instruction key 124 by operation thereof can be confirmed by the recording direction display mark 9. For example, in the case of the photographing image screen (horizontally laid attitude) with the camera in its ordinary attitude, when the recording direction display mark 9 is pointed upwardly of the drawing as illustrated in FIG. 12, the recording data become erected relative to the photographing image screen. When photographing is performed with the camera being turned upside down and an operator wishes to erect the data in conformity with the photographing image screen, the data recording direction instruction key 124 is depressed twice. As a result of this operation, the display of the data recording direction display mark 9 becomes a downwardly pointed arrow mark display. And simultaneously, in the recording data display element 14 of the data recording section 2, the display thereof is switched so that the recording data become erect relative to the vertically inverted photographed image.

Figure 13:
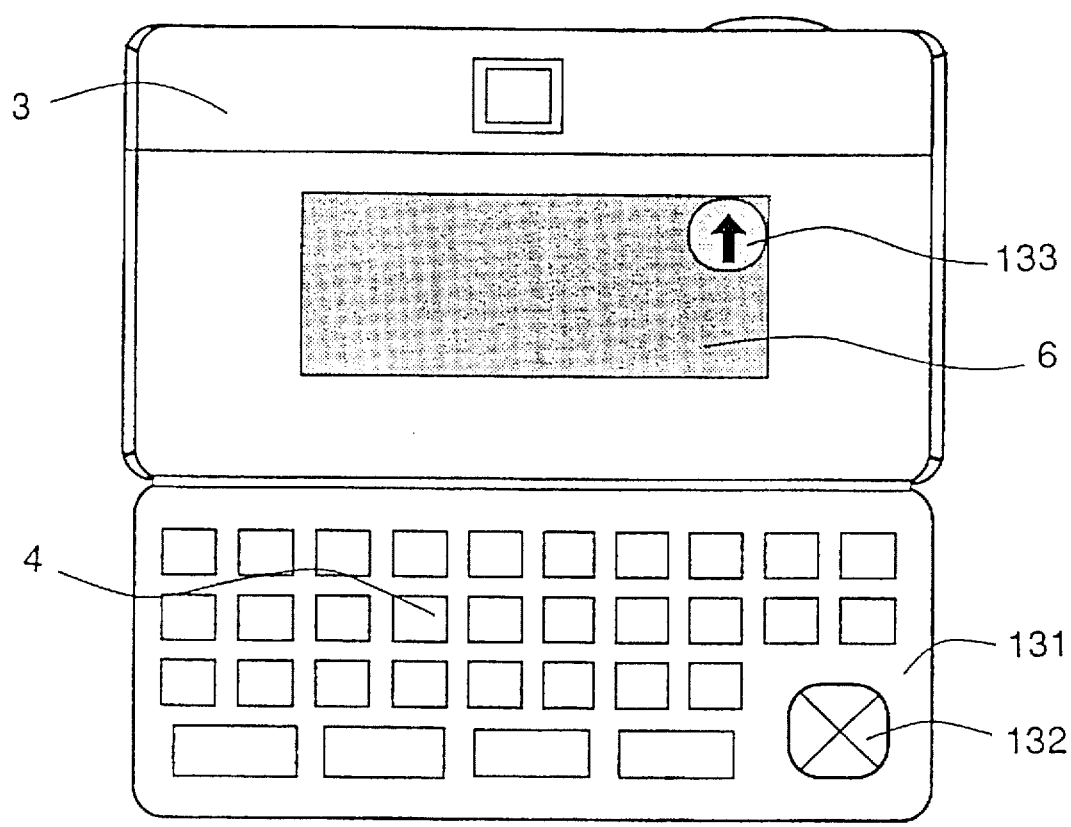
FIG. 13 illustrates a second structure of the data input section of the recording data erecting apparatus according to the third embodiment of the present invention.

FIG. 13 illustrates a second structure of the data input section of the recording data erecting apparatus according to the fourth embodiment of the present invention.

In the second structure according to the fourth embodiment, the operation keyboard 4 of the data input section 1 arid the display unit 6 are mounted in a form wherein both are integrated with the main body 3 of the camera. The difference between the first structure and this second structure is that the operation keyboard 4 is made into a folding type and integrated with the main body 3 of the camera.

When inputting recording data, the operation keyboard 4 folded on the back cover side of the camera is opened and the inputting operation is performed. Also, when it is not necessary to use the operation keyboard, this operation keyboard is folded onto the back cover side of the camera and integrated therewith. Recording data as inputted can be monitored by the display unit 6 mounted on the back cover of the main body 3 of the camera.

The erection direction of recording data can be instructed from the recording direction instruction key 132 of the operation keyboard 4 by operation thereof. The erection of recording data can be confirmed by the recording data instruction display 133.

In this embodiment, the portability of the camera is greatly improved by integrating the main body 3 of the camera and the data input section 1 and in addition there is the effect that this camera can have the same function as that of the camera wherein the main body 3 thereof is separated from the data input section 1.

(5) Fifth Embodiment

Figure 14:
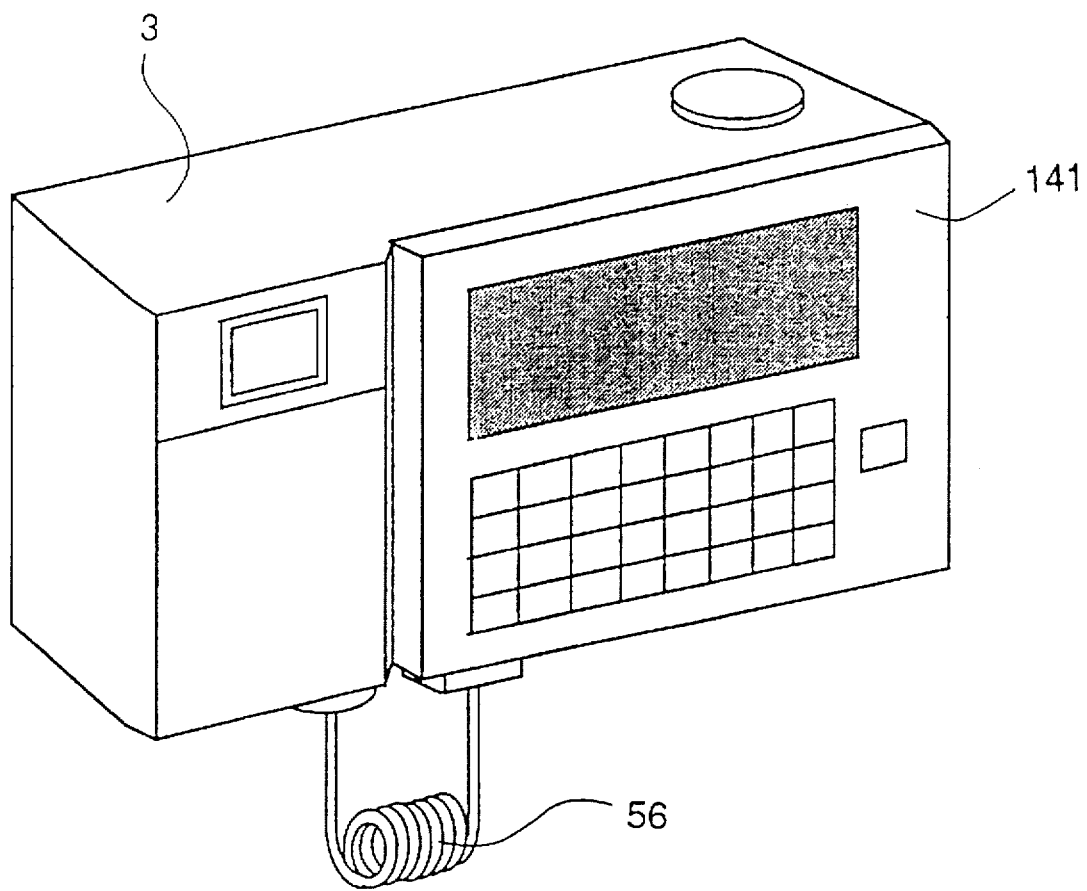
FIG. 14 illustrates a first structure of a data input section of a recording data erecting apparatus according to a fourth embodiment of the present invention.

FIG. 14 illustrates a first structure of the data input section according to a fifth embodiment of the present invention.

In the first structure according to this embodiment, an operation panel 141 of the data input section 1 has a structure independent from that of the main body 3 of the camera. As illustrated in FIG. 14, although the operation panel 141 can be mounted on the main body 3 of the camera and integrated therewith, it is easily removable therefrom. When inputting recording data, the inputting operation can be performed in any way in which the operation panel 141 is kept mounted on the main body 3 of the camera or in which the operation panel 141 is separated therefrom. Data transmission between the operation panel 141 and the main body 3 of the camera is performed with the use of the connection line 56.

Figure 15:
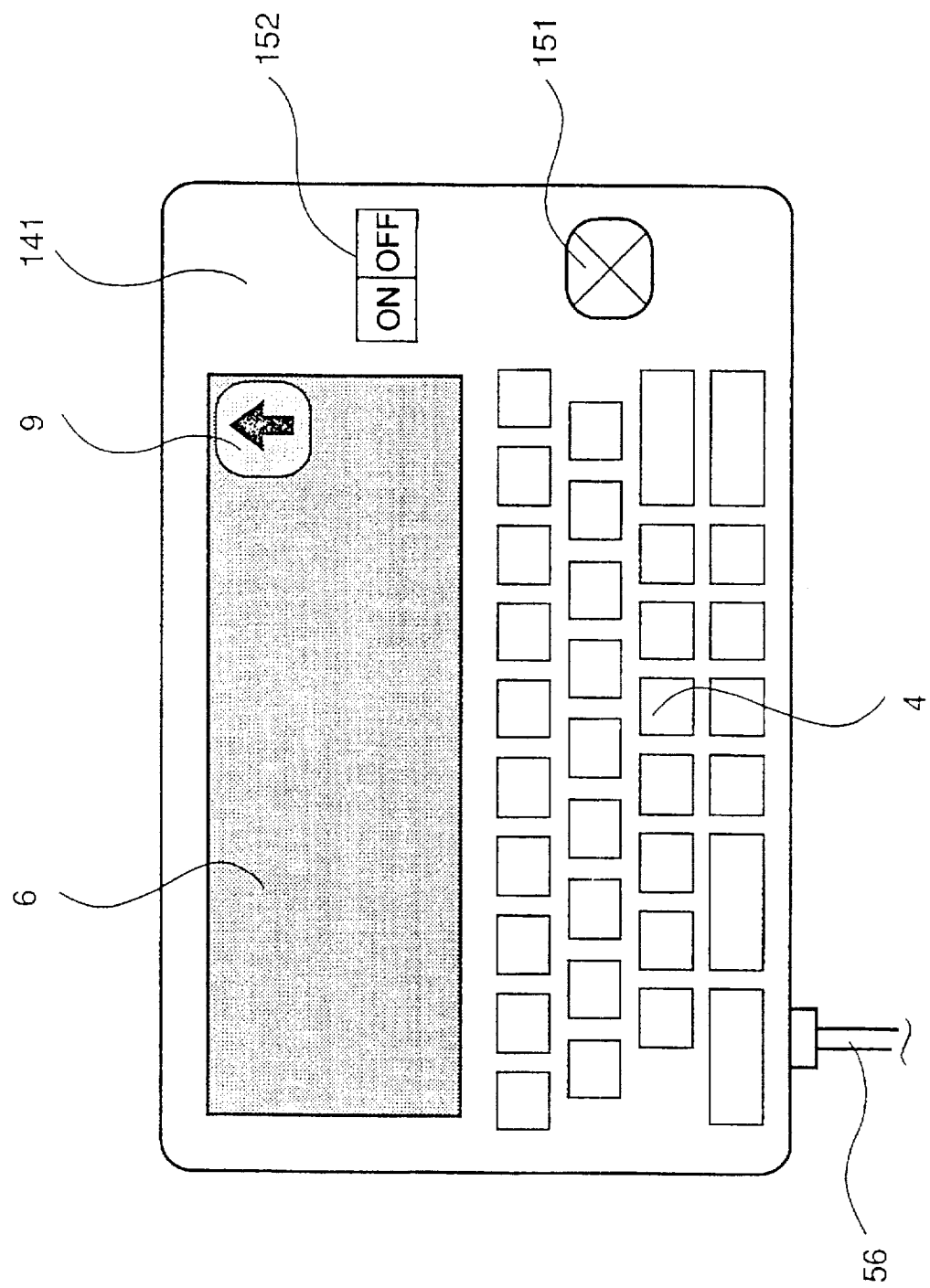
FIG. 15 is a plan view illustrating an operation panel of a first structure of a data input section of a recording data erecting apparatus according to a fourth embodiment of the present invention.

FIG. 15 is a plan view illustrating the operation panel 141 of the first structure of the data input section according to this embodiment.

The operation panel 141 is comprised of the operation keyboard 4 and the display unit 6.

On the operation keyboard 141 there are arranged various input keys including a recording direction instruction key 151 enabling the instruction of the erection direction of recording data. By sequentially depressing the recording direction instruction key 151 of the operation keyboard 4, the erection direction of the recording data displayed on the recording data display element 15 of the data input section 2 changes in the order of ordinary attitude→right/up vertical attitude→vertically inverted attitude→left/up vertical attitude→ordinary attitude. As a result, the attitude of recording data can be freely selected so that the recording data become erect in conformity with an image photographed by the camera.

In the display unit 6 there is provided a display image screen including the recording direction display mark 9 enabling the confirmation of the data recording direction. The copying/recording direction display mark displays the data recording direction in synchronism with the instruction made from the recording direction instruction key 151 by operation thereof. As a result, it is possible to confirm the data recording direction.

Figure 16:
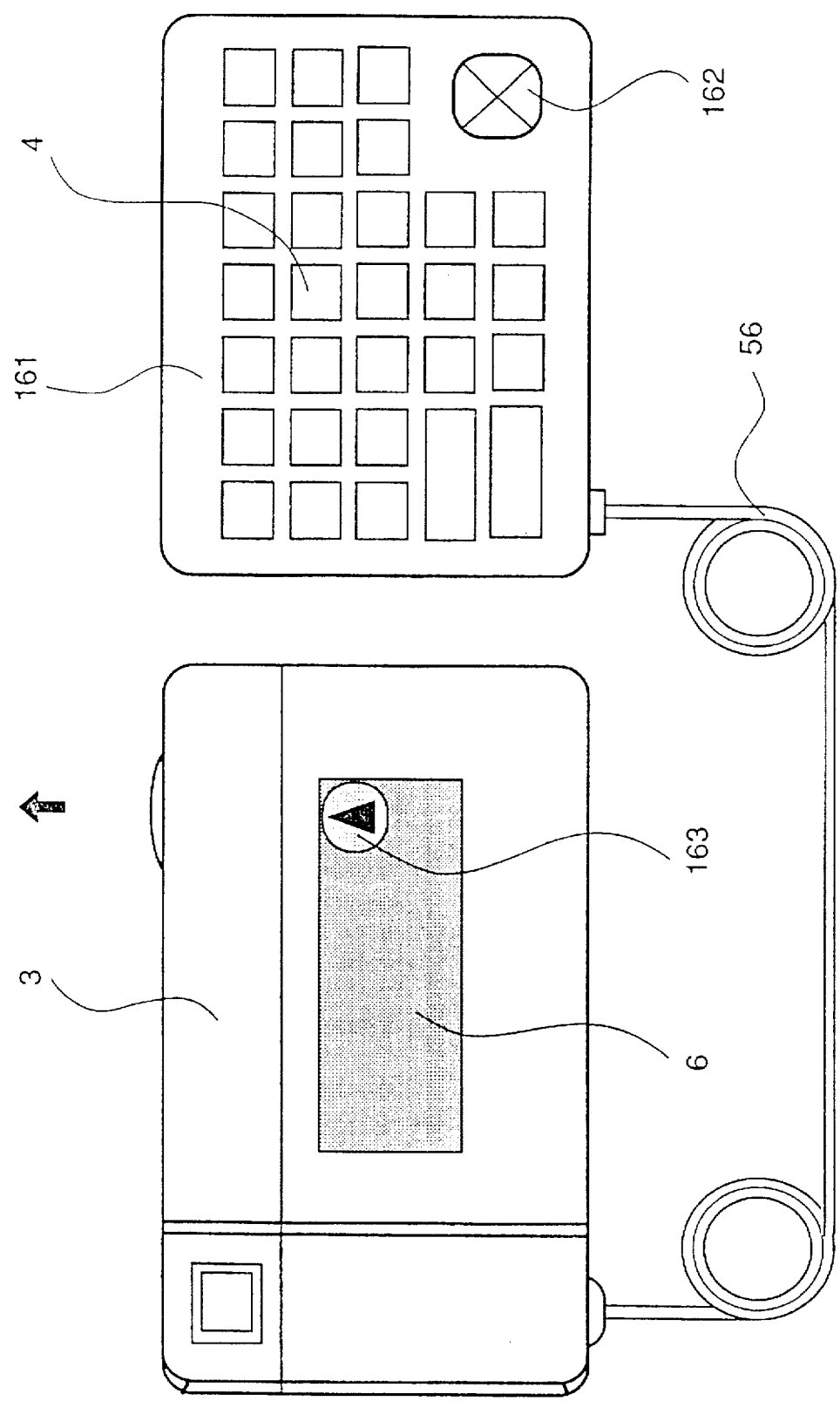
FIG. 16 illustrates a second structure of the data input section of the recording data erecting apparatus according to the fourth embodiment of the present invention.
Figure 17:
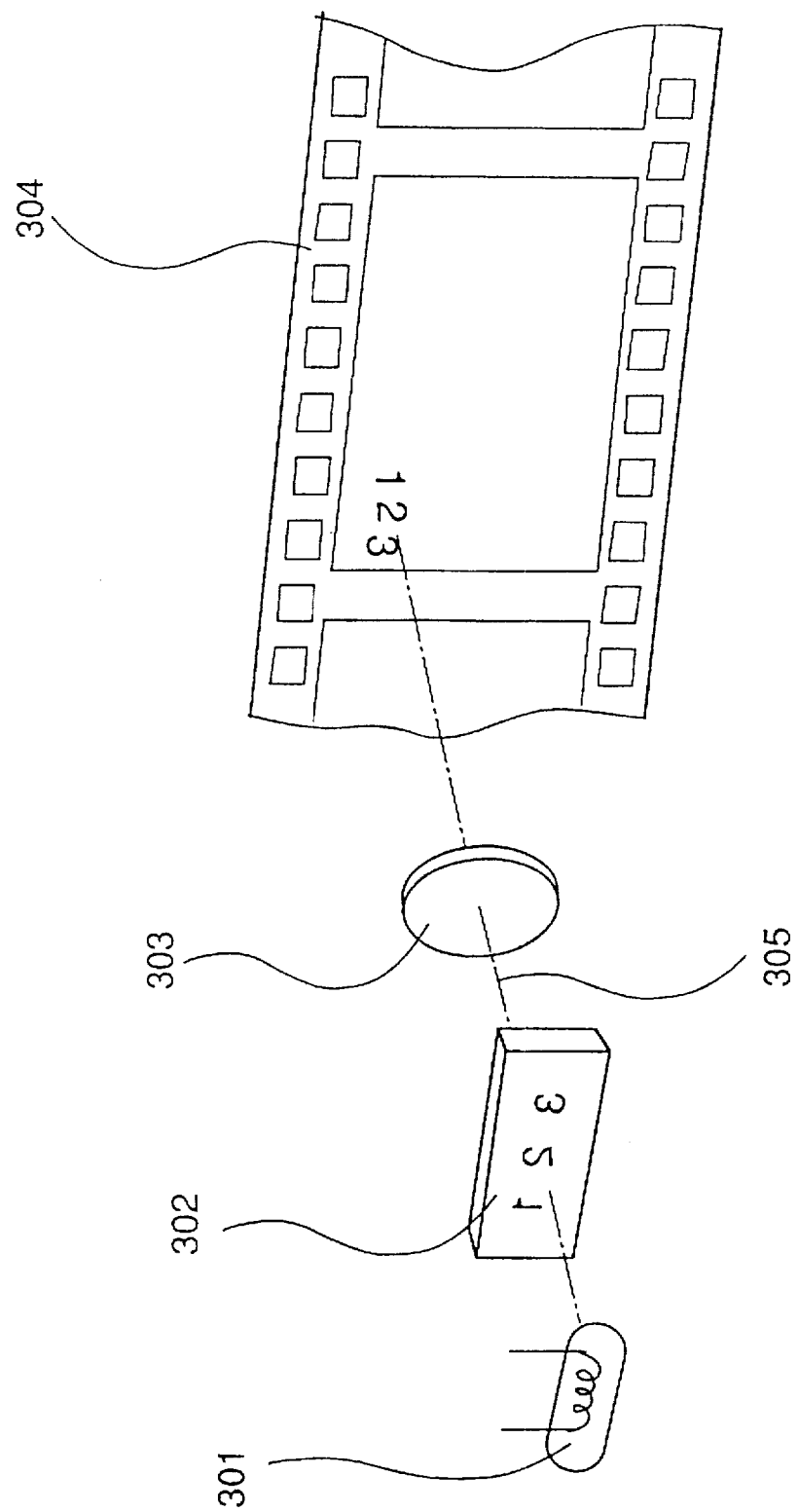
FIG. 17 is a view illustrating a data recording camera according to a conventional technique.
Figure 18:
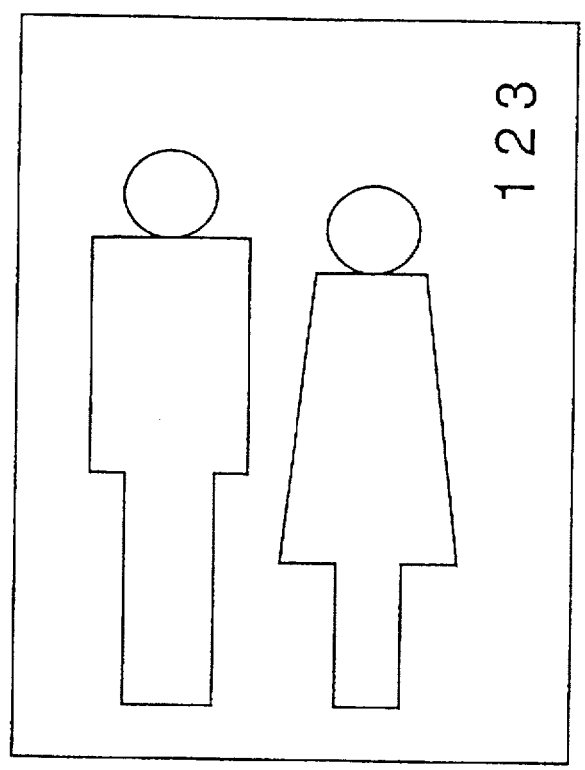
FIG. 18 illustrates a photographed image screen in the case where the photograph has been taken with the data recording camera according to the conventional technique being vertically positioned.
Figure 19:
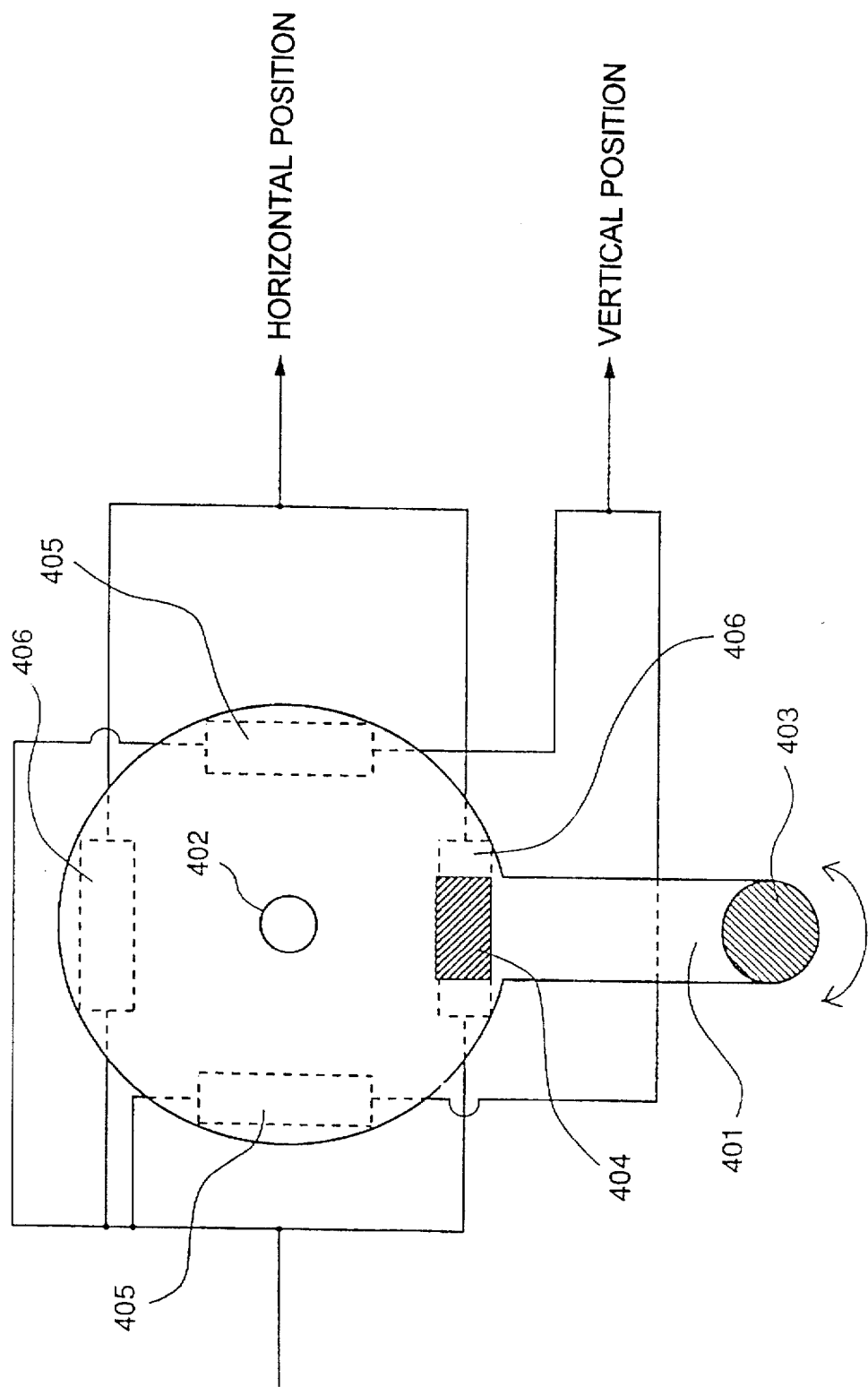
FIG. 19 is a view illustrating a data recording apparatus according to the conventional technique which uses an attitude sensor and vertically and horizontally disposed recording display elements.
Figure 20:
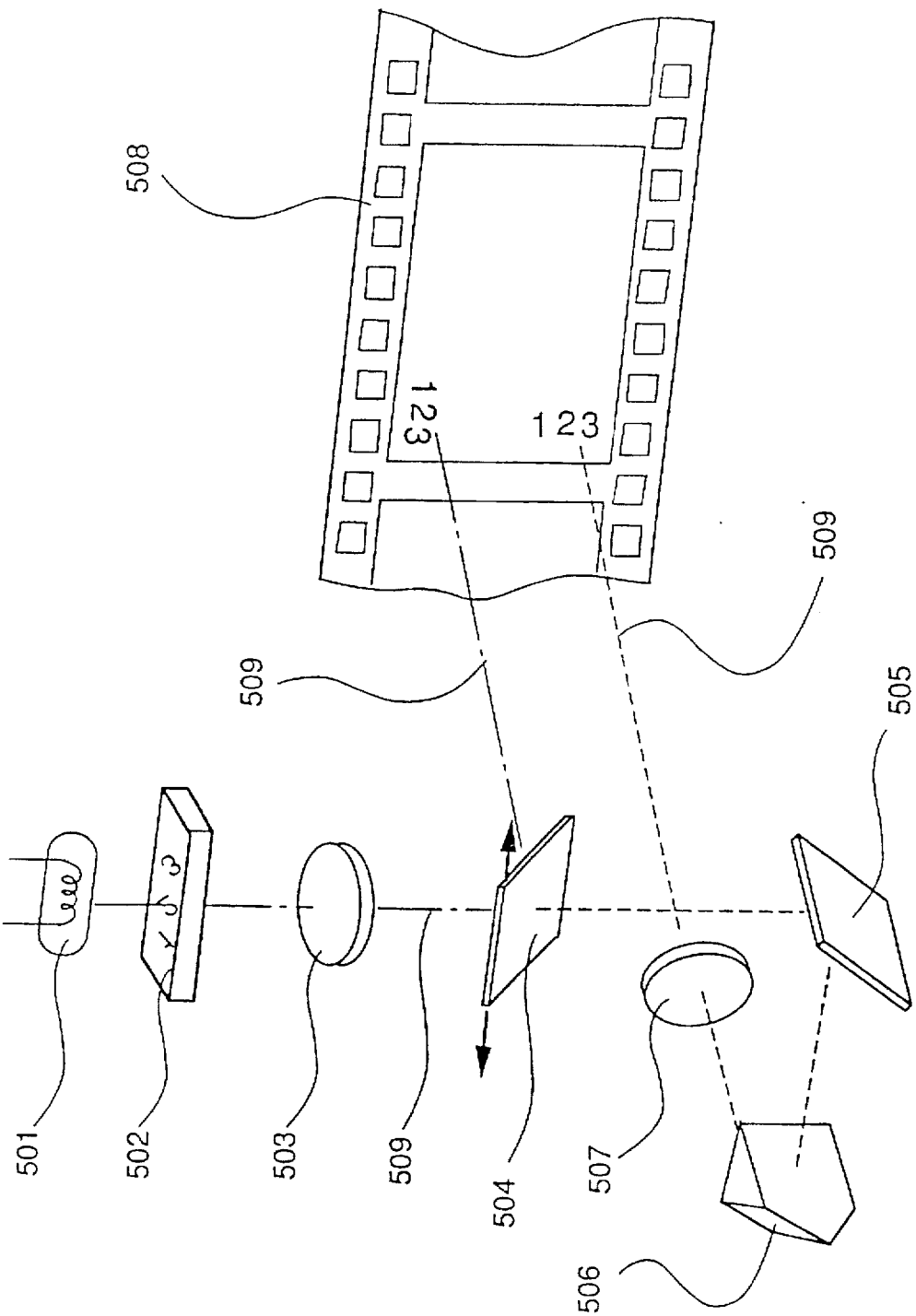
FIG. 20 is a view illustrating the data recording apparatus according to the conventional technique which drives its optical system.

FIG. 16 illustrates a second structure of the data input section according to the fifth embodiment of the present invention.

In the second structure according to this embodiment, the data input section 1 has a structure independent from that of the main body 3 of the camera and is easily removable therefrom. The data input section 1 is connected to the main body 3 of the camera by means of the connection line 56 for data transmission.

As illustrated in FIG. 16, the difference of this second structure of the data input section according to this embodiment from the first structure thereof is that an operation panel 161 thereof is composed of the operation keyboard 4 alone. The operation keyboard 4 is composed of various input keys including a recording direction instruction key 162. The display unit 6 including a recording direction display mark 163 is provided on the main body 3 of the camera. When inputting recording data, the operation panel 161 is removed from the main body 3 of the camera and used. When the operation panel 161 is left out of use, it is attached to the main body 3 of the camera and thereby integrated therewith.

The function of the recording direction instruction key 162 is the same as in the case of the above-mentioned other embodiments and, through the operation of this key 162, the attitude of recording data can be freely selected so that these data become erect in conformity with an image photographed by the camera. Also, the recording direction display mark 163 displays the data recording direction in synchronism with the instruction made from the recording direction instruction key 162 by operation thereof. This enables the confirmation of the data recording direction.

In this embodiment, the keys can be increased in number and size more than in the case of providing the keyboard directly on the main body of the camera. Further, the area of the display unit can also be increased more. As a result, the key operation can be easily and quickly performed. Furthermore, there is the effect that the key inputting operation can be performed in a simple manner without impairing the portability of the camera.

(6) Sixth Embodiment

On the main body of the camera, there is provided position detecting means composed of a position sensor such as a mercury switch or the like, which position detecting means is intended to detect the direction or attitude of the main body of the camera. The output signal from the position sensor is discriminated by discriminating means composed of a comparator to thereby detect the vertical or horizontal attitude of a photographed image. For example, by disposing a vertical position sensor and a horizontal position sensor and comparing the signals from these two sensors with each other, the vertical attitude and the horizontal attitude can be determined. Next, the signal from the discriminating means is input to the vertical and horizontal drive switching circuit of FIG. 1 to thereby automatically determine the vertical or the horizontal attitude, thus copying and recording erect data which conform thereto.

According to this embodiment, data copying/recording operation can be easily performed without performing the erection direction instructing operation and with a reduced number of key operation procedures.

As described above, the data recording apparatus for use in a camera according to the present invention comprises a data recording section enabling the copying and recording of data onto a photosensitive surface of the film in any desired one of the vertical and horizontal directions thereof, a data input section enabling the writing of recording data onto the photosensitive surface of the film in any desired one of the vertical and horizontal directions thereof, and display means enabling the confirmation of the erection direction of copying/recording data instructed from the data input section by operation thereof and provided on a main body of the camera or the data input section, whereby the apparatus has the effects as described below.

(1) Data such as characters, numerals or the like can be erected in any freely selected one of the vertical and horizontal directions in conformity with the attitude of a photographing image screen according to the instruction made from the side of an external input device by operation thereof and without necessitating the use of complicated parts construction, mechanism or optical system.

(2) By providing the main body of the camera or data input section with the display means enabling the confirmation of the erection direction of the recording data as instructed from the side of the input device by operation thereof, errors regarding the data recording direction are decreased, thereby making a photographed data-copied/recorded picture easy to see and read.

What is claimed is:

1. A recording data erecting apparatus for a camera arranged to copy and record data, comprising:

data input means for inputting a recording data;

data recording means for recording the recording data in a vertical direction of a photosensitive surface of a film or a horizontal direction thereof;

erection direction input means electrically connected to the data recording means for inputting an erection direction of the recording data; and display means included in and electrically connected to the data input means for displaying the erection direction of the recording data.

2. A recording data erecting apparatus for a camera arranged to copy and record data, comprising:

data input means for inputting a recording data;

data recording means for recording the recording data in a vertical direction of a photosensitive surface of a film or a horizontal direction thereof;

erection direction input means electrically connected to the data recording means for inputting an erection direction of the recording data, the erection direction input means having a key switch; and display means electrically connected to the data input means for displaying the erection direction of the recording data.

3. A recording data erecting apparatus for a camera arranged to copy and record data, comprising:

data input means for inputting a recording data;

data recording means for recording the recording data in a vertical direction of a photosensitive surface of a film or a horizontal direction thereof;

erection direction input means electrically connected to the data recording means for inputting an erection direction of the recording data, the erection direction input means having an input pen; and display means electrically connected to the data input means for displaying the erection direction of the recording data.

4. A recording data erecting apparatus for a camera arranged to copy and record data, comprising:

data input means for inputting a recording data, the data input means being mounted on part of the outside of a main body of the camera;

data recording means for recording the recording data in a vertical direction of a photosensitive surface of a film or a horizontal direction thereof;

erection direction input means electrically connected to the data recording means for inputting an erection direction of the recording data; and display means electrically connected to the data input means for displaying the erection direction of the recording data.

5. A recording data erecting apparatus for a camera arranged to co and record data comprising:

data input means for inputting a recording data, the data input means being removably attachable to a main body of the camera;

data recording means for recording the recording data in a vertical direction of a photosensitive surface of a film or a horizontal direction thereof;

erection direction input means electrically connected to the data recording means for inputting an erection direction of the recording data; and display means electrically connected to the data input means for displaying the erection direction of the recording data.

6. A recording data erecting apparatus comprising:

data input means for inputting a recording data;

data recording means for recording the recording data in a vertical direction of a photosensitive surface of a film or a horizontal direction thereof;

a vertical and horizontal drive switching circuit for switching between a vertical drive circuit and a horizontal drive circuit;

an up and down inverting circuit connected between the vertical and horizontal drive switching circuit and the vertical drive circuit for switching an operating direction of the vertical drive circuit;

a right and left inverting circuit connected between the vertical and horizontal drive switching circuit and the horizontal drive circuit for switching an operating direction of the horizontal drive circuit; and erection direction input means electrically connected to the data recording means for inputting an erection direction of the recording data.

7. A recording data erecting apparatus for a camera, comprising: a data input section for inputting a recording data; a data recording section for recording the recording data; an erection direction input unit connected to the data recording section for inputting an erection direction of the recording data; and a display unit included in and connected to the data input section for displaying the erection direction of the recording data.

8. A recording data erecting apparatus for a camera, comprising: a data input section for inputting a recording data, the data input section being removably attached to a main body of a camera; a data recording section for recording the recording data; an erection direction input unit connected to the data recording section for inputting an erection direction of the recording data; and a display unit connected to the data input section for displaying the erection direction of the recording data.

9. A recording data erecting apparatus for a camera, comprising: a data input section for inputting a recording data; a data recording section for recording the recording data; an erection direction input unit connected to the data recording section for inputting an erection direction of the recording data; a display unit connected to the data input section for displaying the erection direction of the recording data; a vertical drive circuit; a horizontal drive circuit; a vertical and horizontal drive switching circuit for switching between the vertical drive circuit and the horizontal drive circuit; a first inverting circuit for switching an operating direction of the vertical drive circuit; and a second inverting circuit for switching an operating direction of the horizontal drive circuit.

10. A recording data erecting apparatus as claimed in claim 9; wherein the first inverting circuit is connected between the vertical and horizontal drive switching circuit and the vertical drive circuit; and wherein the second inverting circuit is connected between the vertical and horizontal drive switching circuit and the horizontal drive circuit.

11. In a camera for taking pictures by exposing a film in either a landscape format or a portrait format: a data input section for inputting recording data which is to appear on a picture to be taken; a data direction input unit operated by a user of the camera for selecting a direction in which the recording data is to appear on the picture based on whether the picture is to be taken in the landscape or portrait format; a data recording section for recording on the film the inputted recording data in accordance with the selected direction; and a display unit included in the data input section for displaying the selected direction of the recording data.

12. A camera as claimed in claim 11; wherein the data direction input unit is included in the data input section.

13. In a camera for taking pictures by exposing a film in either a landscape format or a portrait format: a data input section for inputting recording data which is to appear on a picture to be taken; a data direction input unit operated by a user of the camera for selecting a direction in which the recording data is to appear on the picture based on whether the picture is to be taken in the landscape or portrait format, the data direction input unit being removably attachable to a main body of the camera; and a data recording section for recording on the film the inputted recording data in accordance with the selected direction.

14. In a camera for taking pictures by exposing a film in either a landscape format or a portrait format: a data input section for inputting recording data which is to appear on a picture to be taken, a data direction input unit operated by a user of the camera for selecting a direction in which the recording data is to appear on the picture based on whether the picture is to be taken in the landscape or portrait format, the data direction input unit having an input pen for inputting the recording data and selecting the direction of the recording data; and a data recording section for recording on the film the inputted recording data in accordance with the selected direction.

* * * * *